US011048306B2

(12) United States Patent
Kwak et al.

(10) Patent No.: US 11,048,306 B2
(45) Date of Patent: Jun. 29, 2021

(54) ELECTRONIC DEVICE INCLUDING SENSOR FOR GENERATING IMAGE DATA USING INCIDENT LIGHT THROUGH OPENING FORMED IN DISPLAY

(71) Applicant: SAMSUNG ELECTRONICS CO., LTD., Suwon-si (KR)

(72) Inventors: Woon Geun Kwak, Suwon-si (KR); Jung Sik Park, Suwon-si (KR); Hyung Sup Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/242,230

(22) Filed: Jan. 8, 2019

(65) Prior Publication Data

US 2019/0212788 A1    Jul. 11, 2019

(30) Foreign Application Priority Data

Jan. 8, 2018  (KR) .................. 10-2018-0002104

(51) Int. Cl.
*G09G 3/3225* (2016.01)
*G06F 1/16* (2006.01)
(Continued)

(52) U.S. Cl.
CPC .......... *G06F 1/1686* (2013.01); *G02B 5/3025* (2013.01); *G06F 1/1626* (2013.01);
(Continued)

(58) Field of Classification Search
CPC .... G06F 3/017; G06F 3/0488; G06F 3/04817; G06F 3/0482; G06F 3/04845;
(Continued)

(56) References Cited

U.S. PATENT DOCUMENTS 8,154,523 B2   4/2012  Miller et al.
8,310,462 B2  11/2012  Miller et al.
(Continued)

FOREIGN PATENT DOCUMENTS

EP        3428967         1/2019
KR   10-2016-0075206      6/2016
(Continued)

OTHER PUBLICATIONS

International Search Report and Written Opinion dated Mar. 29, 2019 in counterpart International Patent Application No. PCT/KR2019/000248.

(Continued)

*Primary Examiner* — Duc Q Dinh
(74) *Attorney, Agent, or Firm* — Nixon & Vanderhye P.C.

(57) ABSTRACT

An electronic device includes a display that includes a first area having a plurality of first pixels arranged with a first density and a second area having a plurality of second pixels arranged with a second density, wherein the display includes at least one layer having an opening formed in at least part of the first area and in at least part of the second area, a first sensor configured to detect incident light through at least part of the first area, and a second sensor configured to generate image data using incident light received through the opening.

19 Claims, 18 Drawing Sheets

(51) Int. Cl.
*H04M 1/02* (2006.01)
*G06F 3/041* (2006.01)
*G02B 5/30* (2006.01)
*G06F 3/01* (2006.01)
*G06F 3/0488* (2013.01)
*H04N 5/225* (2006.01)

(52) U.S. Cl.
CPC .......... *G06F 1/1637* (2013.01); *G06F 1/1652* (2013.01); *G06F 1/1684* (2013.01); *G06F 3/017* (2013.01); *G06F 3/041* (2013.01); *G06F 3/04883* (2013.01); *H04M 1/0268* (2013.01); *H04N 5/2258* (2013.01)

(58) Field of Classification Search
CPC .... G06F 3/04842; G06F 3/011; G06F 3/0485; G06F 9/451; G06F 2203/04803; G06F 1/1626; G06F 1/1637; G06F 1/1652; G06F 1/1684; G06F 1/1686; G06F 3/041; G06F 3/04883; G06F 3/0412; G06F 3/0445; G06F 3/04164; G06F 3/0443; G06F 2203/04103; G06F 2203/04107; G06F 3/044; G06F 3/04886; G06F 3/14; G06F 2203/04105; G06F 3/0416; H04M 1/0268; H04N 5/2258
USPC .................................... 345/173–175, 1.1–1.3
See application file for complete search history.

(56) References Cited

U.S. PATENT DOCUMENTS

| | | |
|---|---|---|
| 8,330,739 B2 | 12/2012 | Miller et al. |
| 8,477,114 B2 | 7/2013 | Miller et al. |
| 9,295,174 B2 | 3/2016 | Witter et al. |
| 9,503,147 B2 | 11/2016 | Witter et al. |
| 9,601,554 B2 | 3/2017 | Park et al. |
| 9,820,355 B2 | 11/2017 | Jia et al. |
| 9,871,550 B2 | 1/2018 | Witter et al. |
| 10,103,769 B2 | 10/2018 | Witter et al. |
| 10,147,757 B2 * | 12/2018 | Lee ...................... G06K 9/0004 |
| 2009/0153438 A1 | 6/2009 | Miller et al. |
| 2012/0154321 A1 | 6/2012 | Miller et al. |
| 2012/0162120 A1 | 6/2012 | Miller et al. |
| 2013/0002593 A1 | 1/2013 | Miller et al. |
| 2015/0195938 A1 | 7/2015 | Witter et al. |
| 2015/0227227 A1 * | 8/2015 | Myers ................. G06F 3/04817 |
| | | 345/173 |
| 2016/0164565 A1 | 6/2016 | Witter et al. |
| 2016/0197131 A1 | 7/2016 | Park et al. |
| 2016/0309564 A1 | 10/2016 | Jia et al. |
| 2016/0358543 A1 * | 12/2016 | Rappoport ............ G06F 3/0481 |
| 2017/0041037 A1 | 2/2017 | Witter et al. |
| 2017/0097535 A1 | 4/2017 | Andou et al. |
| 2017/0287992 A1 | 10/2017 | Kwak et al. |
| 2017/0300736 A1 * | 10/2017 | Song .................. G06K 9/00033 |
| 2017/0359096 A1 | 12/2017 | Witter et al. |
| 2019/0013834 A1 | 1/2019 | Witter et al. |
| 2019/0043452 A1 | 2/2019 | Silvanto et al. |
| 2019/0130822 A1 | 5/2019 | Jung et al. |

FOREIGN PATENT DOCUMENTS

| | | |
|---|---|---|
| KR | 10-2016-0083991 | 7/2016 |
| KR | 10-2017-0024182 | 3/2017 |
| KR | 10-2017-0113066 | 10/2017 |
| WO | 2017-058416 | 4/2017 |

OTHER PUBLICATIONS

Extended Search Report dated Aug. 20, 2019 in counterpart European Patent Application No. 19150689.8.

* cited by examiner

ELECTRONIC DEVICE INCLUDING SENSOR FOR GENERATING IMAGE DATA USING INCIDENT LIGHT THROUGH OPENING FORMED IN DISPLAY

CROSS-REFERENCE TO RELATED APPLICATION

This application is based on and claims priority under 35 U.S.C. § 119 to Korean Patent Application No. 10-2018-0002104, filed on Jan. 8, 2018, in the Korean Intellectual Property Office, the disclosure of which is incorporated by reference herein its entirety.

BACKGROUND

1. Field

The present disclosure relates to an electronic device including a display having an opening formed therein.

2. Description of Related Art

Various forms of electronic devices, such as smartphones, tablet personal computers (PCs), and the like, which include a display have been widely used with the development of information technology (IT).

The displays of the electronic devices may be implemented with what is called a touch screen display that includes a touch panel. An electronic device may execute various functions, such as taking a photo or a video, playing a game, doing a search on the Internet, and the like, through a touch screen display.

In order to execute the various functions, various sensors, including an illuminance sensor, an iris sensor, and the like, and a camera module may be arranged on the front side of the electronic device through which the display is exposed. For example, the electronic device may detect the brightness therearound through the illuminance sensor and may control the brightness of a screen on the display, based on the detection result. In another example, the electronic device may take a photo or a video through the camera module.

The above information is presented as background information only to assist with an understanding of the present disclosure. No determination has been made, and no assertion is made, as to whether any of the above might be applicable as prior art with regard to the present disclosure.

Recently, a technology for extending the active area of a display to the entire front of the electronic device has been attempted to meet user demands for design and maximize visibility.

Meanwhile, the sensors and the camera module have to be disposed on the front side of the electronic device due to their functional nature, and in recent years, the number of sensors mounted in an electronic device has been increased with diversification of functions of the electronic device. Furthermore, with the increase in the number of sensors, the number of openings formed in the front side of the electronic device has also been increased and the black matrix (BM) area around the openings has also been increased.

If the number of sensors and camera modules arranged on the front side of an electronic device increases as described above, the active area of the display may not be extended to a specified level or higher.

SUMMARY

Example aspects of the present disclosure address at least the above-mentioned problems and/or disadvantages and provide at least the advantages described below. Accordingly, an aspect of the present disclosure is to provide an electronic device for extending the active area of a display while locating a sensor and a camera module on the front side of the electronic device.

In accordance with an aspect of the present disclosure, an electronic device includes a display including a first area including a plurality of first pixels arranged with a first density and a second area including a plurality of second pixels arranged with a second density, wherein the display includes at least one layer having an opening formed in at least part of the first area and the second area, a first sensor configured to detect incident light through at least part of the first area, and a second sensor configured to generate image data using incident light through the opening.

In accordance with another aspect of the present disclosure, an electronic device includes a display including a first area having pixels arranged in a first structure and a second area having pixels arranged in a second structure, an opening formed in at least part of the display, one or more sensors disposed below the first area, and an image sensor that is disposed in or below the opening and that is configured to receive light through the opening.

According to the embodiments of the present disclosure, the active area of the display can be increased. Accordingly, it is possible to provide more excellent design aesthetics and convenience of use to a user. Furthermore, according to the example embodiments of the present disclosure, it is possible to reduce visual discomfort that the user feels. In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to the description of the drawings, similar reference numerals may be used to refer to similar or related components.

DETAILED DESCRIPTION

Figure 1:
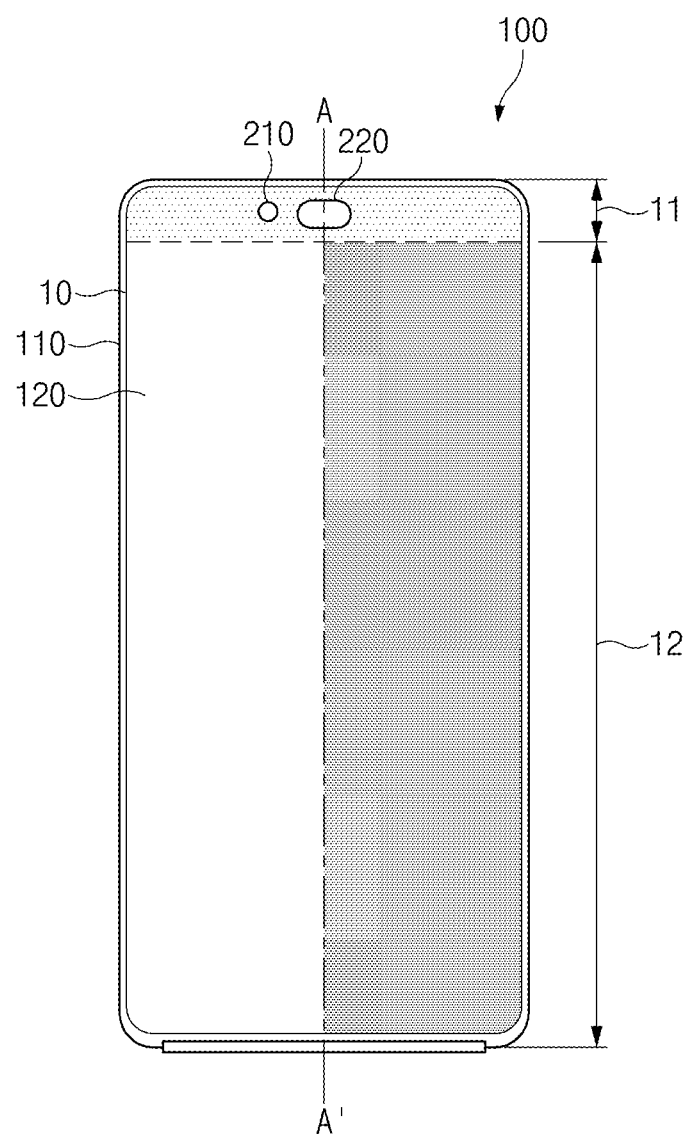
FIG. 1 is a front view illustrating an electronic device including a display, according to an embodiment.

FIG. 1 is a front view illustrating an electronic device 100 including a display 120, according to an embodiment.

Referring to FIG. 1, the electronic device 100 may include a housing 110. The housing 110 may form the external appearance of the electronic device 100 and may protect components inside the electronic device 100 from external shocks.

According to an embodiment, the electronic device 100 may include the display 120. The display 120 may be exposed to the outside through a surface (e.g., the front surface) of the housing 110. According to an embodiment, the display 120 may output contents (e.g., text, an image, a video, an icon, a widget, or a symbol), and/or may receive an input (e.g., a touch input or an electronic pen input) from a user.

According to an embodiment, the display 120 may include an active area 10. The active area 10 may be understood as an area where pixels are arranged in a display panel. According to various embodiments, without being limited to only the display panel, the active area 10 may be understood as an area including a plurality of layers (e.g., a polarization layer 140 and/or a cushion layer 160 of FIG. 2, or the like) that comprise the display 120. For example, the active area 10 may also be understood as an area of the cushion layer 160 illustrated in FIG. 2 that corresponds to the area where the pixels are arranged in the display panel.

According to an embodiment, the display 120 may include an inactive area (not illustrated) that corresponds to at least a portion of the active area 10. In an embodiment, the inactive area may be located outside the active area 10. The inactive area may be understood as an area where no pixels are arranged in the display panel.

According to an embodiment, the active area 10 may include a first area 11 and a second area 12. In various embodiments, the first area 11 and the second area 12 may be understood as areas that include the plurality of layers comprising the display 120 in substantially the same manner as the active area 10.

The first area 11 and the second area 12 may differ from each other in terms of the arrangement of pixels in the display 120. For example, the first area 11 may include first pixels arranged in a first arrangement, and the second area 12 may include second pixels arranged in a second arrangement. In this disclosure, the first pixels may be referred to as a first group of pixels, and the second pixels may be referred to as a second group of pixels. The first arrangement in which the first pixels are arranged and the second arrangement in which the second pixels are arranged may be made in various ways. According to an embodiment, the first pixels may be arranged with a first density, and the second pixels may be arranged with a second density. In an embodiment, the first density may be lower than the second density.

According to an embodiment, a screen displayed on the first area 11 and a screen displayed on the second area 12 may have different resolutions since the first pixels and the second pixels differ from each other in terms of the pixel arrangement. For example, the second pixels may be arranged with a higher density than the first pixels. In this case, the resolution of the second area 12 may be higher than the resolution of the first area 11.

According to an embodiment, an electrode and/or an interconnection wire disposed in the first area 11 may be substantially transparent. For example, a substantially transparent electrode and/or interconnection wire made of a material such as indium tin oxide (ITO), or the like, may be disposed in at least part of the first area 11.

According to an embodiment, screens distinguished from each other may be displayed on the first area 11 and the second area 12. For example, a screen indicating the current status of the electronic device 100 may be displayed on the first area 11, and an application executed in the electronic device 100 may be displayed on the second area 12.

According to an embodiment, the electronic device 100 may include a first sensor 210 and a second sensor 220. According to an embodiment, the electronic device 100 may include one or a plurality of first sensors 210 and second sensors 220. In an embodiment, the first sensor 210 may include, for example, and without limitation, at least one of a proximity sensor, an illuminance sensor, a gesture sensor, a motion sensor, a fingerprint recognition sensor, a biometric sensor, or the like. In an embodiment, the second sensor 220 may, for example, and without limitation, be a light receiving sensor. For example, the second sensor 220 may include, for example, and without limitation, at least one of light receiving parts of an image sensor for taking an image or a video, an illuminance sensor, a proximity sensor, or the like.

In an embodiment, in the case where the electronic device 100 includes a plurality of second sensors 220, the plurality of second sensors 220 may be arranged in the same structure. For example, a camera and an iris camera may be arranged in the same structure as the plurality of second sensors 220. In another example, a plurality of cameras comprising a depth camera may be arranged in the same structure as the plurality of second sensors 220. In another example, a camera and a proximity sensor may be arranged in the same structure as the plurality of second sensors 220.

The first sensor 210 and the second sensor 220 illustrated in FIG. 1 are illustrative, and embodiments of the present disclosure are not limited to those illustrated in FIG. 1. For example, the first sensor 210 and the second sensor 220, may be disposed on a side of the first area 11.

According to an embodiment, the first sensor 210 may be disposed below the first area 11. According to an embodiment, the first group of pixels may be arranged in the first area 11 with a lower density than the second group of pixels arranged in the second area 12. Accordingly, the first area 11 may have a higher light transmittance than the second area 12.

For example, in the display panel, a section of the first area 11 in which no pixels are arranged may be larger than a section of the second area 12 in which no pixels are arranged. In other words, the first area 11 of the display panel may have a larger light transmitting section than the second area 12. In this case, the first sensor 210 may receive light through a light transmitting section included in the first area 11.

According to an embodiment, the second sensor 220 may be disposed below at least part of the first area 11 and the second area 12. For example, likewise to the first sensor 210, the second sensor 220 may be disposed below the first area 11. Alternatively, the second sensor 220, unlike the first sensor 210, may be disposed below the second area 12. According to another embodiment, the second sensor 220 may be disposed below both the first area 11 and the second area 12.

According to an embodiment, the second sensor 220 may obtain image data through an opening formed in at least one layer of the display 120. For example, light may be introduced into the electronic device 100 from the outside through the opening, and the second sensor 220 may obtain image data corresponding to the incident light. In an embodiment, the image data may correspond to data obtained by converting the incident light into an electrical signal by the second sensor 220.

According to various embodiments, the second sensor 220 (e.g., an image sensor) may perform a specified function if the second sensor 220 receives light through the opening to obtain clear image data. On the other hand, the first sensor 210 (e.g., an illuminance sensor or a proximity sensor) may perform a corresponding function even though the first sensor 210 receives light through the first area 11 rather than an opening, because the first sensor 210 detects a change in the amount of light and a period of time during which light is reflected and returns. Accordingly, the number of openings that are formed in the electronic device 100 may be decreased when the first sensor 210 is disposed below the first area 11 as illustrated in FIG. 1.

If the number of openings is decreased, an inactive area to be formed around the openings may be decreased. Accordingly, the range of the active area 10 on the front side of the electronic device 100 may be extended, thereby providing more excellent visibility to a user. For example, the active area 10 may be extended to the entire front of the electronic device 100 except for the area of the second sensor 220.

In this disclosure, the contents described above with reference to FIG. 1 may be identically or similarly applied to components with the same reference numerals as those of the electronic device 100 illustrated in FIG. 1.

Figure 2:
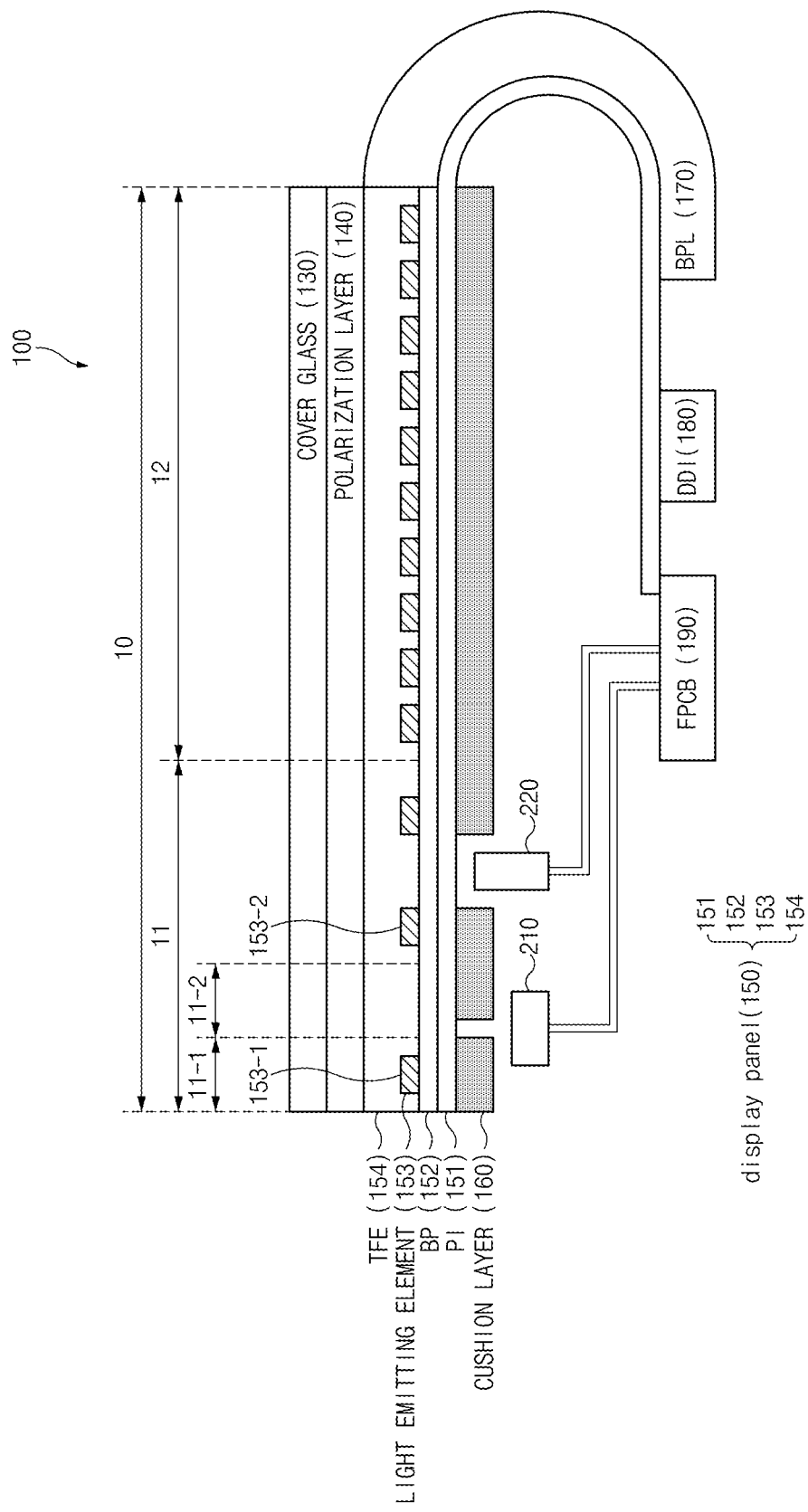
FIG. 2 is a sectional view illustrating the electronic device including the display, according to an embodiment.

FIG. 2 is a sectional view illustrating the electronic device 100 including the display 120, according to an embodiment. FIG. 2 may be identical or similar to a sectional view of the electronic device 100 taken along line A-A' of FIG. 1.

Referring to FIG. 2, the electronic device 100 may include a cover glass 130, the polarization layer 140, a display panel 150, the cushion layer 160, a bending protect layer (BPL) 170, a display driver IC (DDI) 180, a flexible printed circuit board (FPCB) 190, the first sensor 210, and the second sensor 220. In an embodiment, the polarization layer 140, the display panel 150, the cushion layer 160, the BPL 170, and the display driver IC 180 may comprise at least a part of the display 120 illustrated in FIG. 1.

According to various embodiments, the electronic device 100 may further include components not illustrated in FIG. 2, or may not include some of the components illustrated in FIG. 2. For example, the electronic device 100 may further include an optical clear adhesive (OCA), a protection film (PF), and/or an adhesive tape. According to another embodiment, the electronic device 100 may further include a blocking member disposed between the display panel 150 and the cushion layer 160 such that the first sensor 210 is not visible from outside the electronic device 100. The blocking member may include, for example, an infrared (IR) shielding film or a polarizer film.

In this disclosure, the cover glass 130, the polarization layer 140, the display panel 150, and/or the cushion layer 160 may be understood as a plurality of layers that comprise the display 120. According to various embodiments, the display 120 may not include at least some of the components, or may further include an additional component.

The cover glass 130 may transmit light generated by the display 120. In another example, a user may touch the cover glass 130 with a part (e.g., a finger) of the user's body to provide a touch input (including contact using an electronic pen) to the electronic device 100. The cover glass 130 may be formed of, for example, reinforced glass, reinforced plastic, or a flexible polymer and may protect the display 120 and the components included in the electronic device 100 from external shocks.

According to an embodiment, the cover glass 130 may be implemented with a plurality of layers. For example, the cover glass 130 may be implemented with a flexible cover glass layer and a rigid cover glass layer. According to various embodiments, the cover glass 130 may also be referred to as a glass window or a transparent member.

The polarization layer 140 may prevent and/or reduce reflection of external light to improve visibility in bright places such as the outdoors. For example, the polarization layer (or polarizer film) 140 may pass only light waves oscillating in any one direction among incident light waves through the cover glass 130, thereby improving visibility. In various embodiments, the polarization layer 140 may include, for example, poly-ethylene terephthalate (PET) or tri-acetyl cellulose (TAC).

The display panel 150 may include a thin film encapsulation (TFE) 154, light emitting elements 153, a backplane (BP) 152, and a PI substrate 151.

The TFE 154 may be disposed below the polarization layer 140. The TFE 154 may protect the light emitting elements 153 included in the display panel 150. For example, the TFE 154 may be formed of a plurality of organic layers and/or inorganic layers and may protect the plurality of light emitting elements 153 from moisture or oxygen.

A plurality of interconnection wires and the plurality of light emitting elements 153 may be arranged on the BP 152. For example, a plurality of gate lines and a plurality of data lines may be arranged on the BP 152, and the gate lines and the data lines may cross each other. The light emitting elements 153 may emit light based on signals supplied from the gate lines and the data lines. The light emitting elements 153 may include pixels. A plurality of (e.g., millions to tens of millions of) pixels may be arranged on any one surface (e.g., a surface facing the cover glass 130) of the display panel 150.

The BP 152 may be understood to be a thin film transistor array or a buffer layer. The buffer layer may prevent and/or reduce impure elements from penetrating into the PI substrate 151 and may provide a flat surface to the top side of the PI substrate 151. The BP 152, which is the buffer layer, may be formed of various materials capable of providing a flat surface. For example, the buffer layer may contain an inorganic material such as glass or a synthetic resin (e.g., PET), or an organic material such as polyimide, polyester, or an acrylic resin.

According to an embodiment, the display panel 150 may include the PI substrate 151. According to an embodiment, interconnection wires for supplying power and/or signals to the display panel 150 may be arranged on the PI substrate 151. According to an embodiment, the PI substrate 151 may extend outside at least some layers of the display panel 150.

According to an embodiment, the display panel 150 may include the active area 10 and the inactive area. The active area 10 may include the first area 11 and the second area 12.

According to an embodiment, pixels may be arranged with a higher density in the second area 12 than in the first area 11. In other words, the number of pixels arranged in a region with a specified area may be larger in the second area 12 than in the first area 11. In this case, the second area 12 may implement a higher resolution than the first area 11, and the first area 11 may have a higher light transmittance than the second area 12.

According to an embodiment, at least some of the pixels arranged in the first area 11 may be spaced apart from each other by a specified distance. For example, a first row in which pixels are arranged and a second row in which no pixels are arranged may be repeated a specified number of times in the first area 11. The area corresponding to the first row may be understood as an opaque area 11-1, and the area corresponding to the second row may be understood as a transparent area 11-2. In this case, at least some (e.g., first light emitting elements 153-1 and second light emitting elements 153-2) of the pixels arranged in the first area 11 may be spaced apart from each other by a specified distance corresponding to the transparent area 11-2.

Unlike the pixels arranged in the first area 11, the pixels arranged in the second area 12 may be connected together, instead of being spaced apart from each other. In various embodiments, the pixels in the second area 12, which are connected together instead of being spaced apart from each other, may be understood as being densely arranged with an interval smaller than a specified size.

The cushion layer 160 may include at least one of a light shielding layer (e.g., an EMBO layer) and a buffer layer (e.g., a sponge layer). The cushion layer 160 may absorb external shocks, thereby protecting the other components inside the electronic device 100. The cushion layer 160, as illustrated in FIG. 2, may have an opening formed in at least part thereof.

According to various embodiments, the electronic device 100 may further include a shielding layer (not illustrated). The shielding layer may be formed of, for example, and without limitation, copper (Cu) or graphite and may block electro-magnetic interference between the display panel 150 and the FPCB 190.

The BPL 170 may be attached to a bending area of the PI substrate 151 to prevent and/or reduce the display panel 150 from being broken. The BPL 170 may prevent and/or reduce cracks in leads arranged on the PI substrate 151.

The display driver IC 180 may be disposed on a partial area of the PI substrate 151. According to an embodiment, the display driver IC 180 may operate the light emitting elements 153 of the display panel 150. For example, the display driver IC 180 may receive image data from a processor (a host) and may supply signals corresponding to the image data to the display panel 150 based on a preset number of frames. The light emitting elements 153 may emit light in response to the signals.

According to an embodiment, the FPCB 190 may be electrically connected to part of the display panel 150. For example, the FPCB 190 may be electrically connected to the interconnection wires formed on the PI substrate 151 of the display panel 150. According to an embodiment, the FPCB 190 may include a lead for supplying a scan signal to a touch sensor included in the display panel 150.

The first sensor 210 may be disposed below the cushion layer 160. The first sensor 210 may emit or receive light to detect a state external to the electronic device 100. For example, the first sensor 210 may sense the amount of light received from the outside to detect the brightness outside the electronic device 100. According to various embodiments, the first sensor 210 may include, for example, and without limitation, at least one of a proximity sensor, an illuminance sensor, a gesture sensor, a motion sensor, a fingerprint recognition sensor, and a biometric sensor, or the like. According to various embodiments, the electronic device 100 may include a plurality of first sensors 210.

According to various embodiments, since the first sensor 210 emits light outside the electronic device 100 and/or receives light from outside the electronic device 100, a light path from outside the electronic device 100 to the first sensor 210 should be ensured. For example, the first sensor 210 may be disposed below the first area 11 in which the light emitting elements 153 are spaced apart from each other by the specified distance, and therefore a light path may be ensured through the transparent area 11-2 in the first area 11. According to an embodiment, the cushion layer 160, as illustrated in FIG. 2, may be disposed between the display panel 150 and the first sensor 210. In this case, at least a partial area of the cushion layer 160 may be removed, or an opening may be formed in at least a partial area of the cushion layer 160, to ensure the light path.

According to various embodiments, the first sensor 210 may perform a specified function with light sensed by at least part of the first sensor 210. For example, even though part of the first sensor 210 may be hidden by an impediment, the first sensor 210 may perform the specified function if the remaining part of the first sensor 210 is capable of sensing light. That is because the first sensor 210 may detect a change in the amount of light sensed and a period of time during which the light is reflected and returns.

The second sensor 220 may be disposed below the cushion layer 160 and may obtain image data that corresponds to light reflected or generated by a subject outside the electronic device 100. Since the image data has to be obtained for the whole shape of the subject, the second sensor 220, unlike the first sensor 210, may not perform a specified function if part of the second sensor 220 is hidden by an impediment. Therefore, the second sensor 220 may receive light through an opening corresponding to the size of the second sensor 220 to perform the specified function.

According to various embodiments, the opening may be formed in part of the first area 11. Alternatively, the opening may be formed in part of the second area 12. In another case, the opening may be formed over both the first area 11 and the second area 12. Accordingly, the second sensor 220 may be disposed below part of the first area 11 or part of the second area 12, or may be disposed below both the first area 11 and the second area 12. For example, the second sensor 220 may be disposed below part of the first area 11, and the opening may be formed in the part of the first area 11. In this case, in order to allow the second sensor 220 to perform the specified function, the light emitting elements 153 may not be disposed in an area that corresponds to the area in which the second sensor 220 is disposed. In other words, the area in which the second sensor 220 is disposed may correspond to the transparent area 11-2 in the first area 11.

According to various embodiments, an opening may be formed in at least one layer included in the display 120. For example, as illustrated in FIG. 2, an opening may be formed in the cushion layer 160. Without being limited thereto, however, the opening may be formed in, for example, the cushion layer 160 and the display panel 150. In another example, the opening may be formed in the cushion layer 160, the display panel 150, and the polarization layer 140.

In this disclosure, the contents described above with reference to FIG. 2 may be identically or similarly applied to components with the same reference numerals as those of the electronic device 100 illustrated in FIG. 2.

Figure 3:
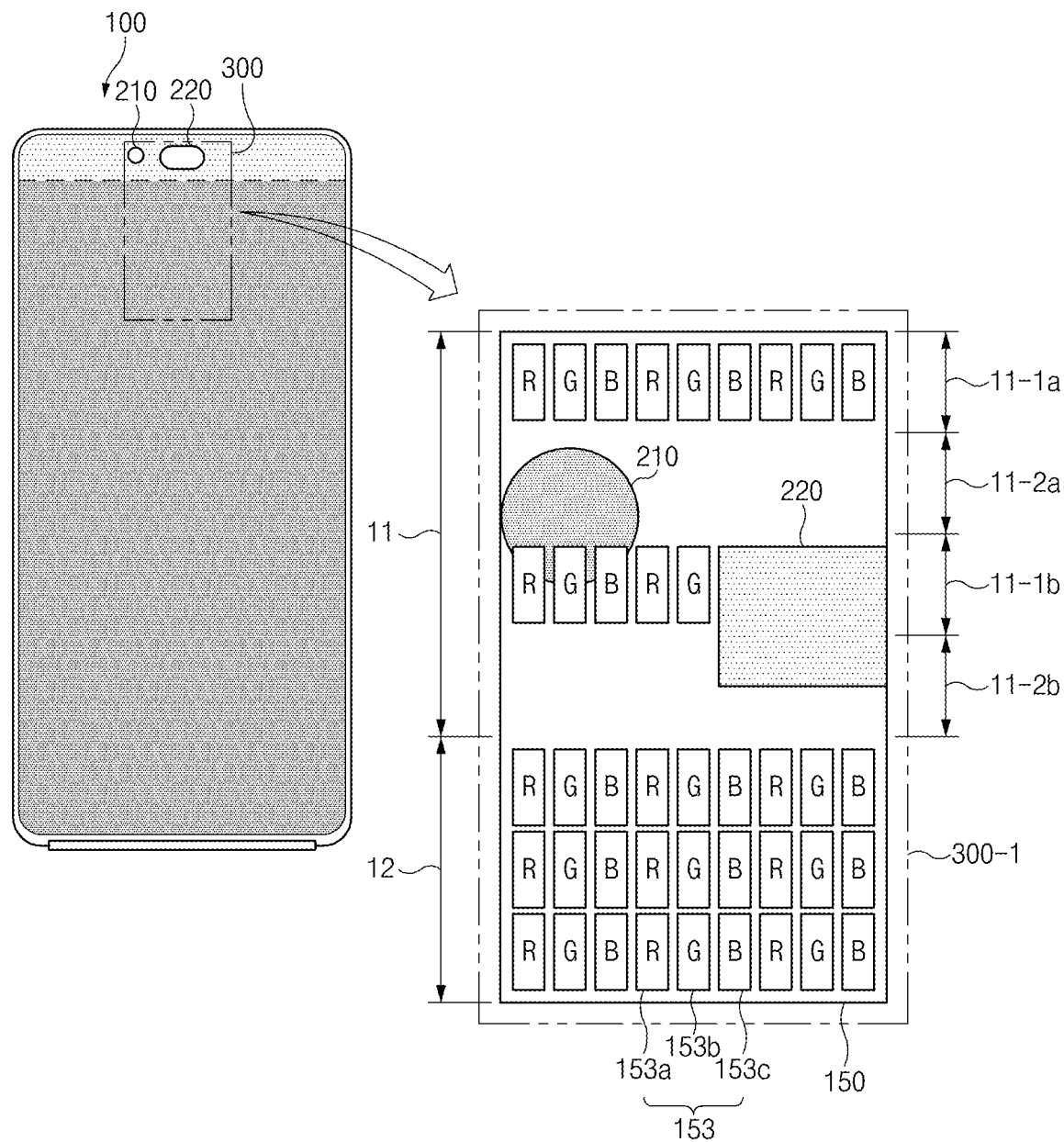
FIG. 3 is a diagram illustrating the display of the electronic device that includes a first area and a second area and below which a first sensor and a second sensor are disposed, according to an embodiment.

FIG. 3 is a diagram illustrating the display 120 of the electronic device 100 that includes the first area 11 and the second area 12 and below which the first sensor 210 and the second sensor 220 are disposed, according to an embodiment.

FIG. 3 illustrates the arrangement (e.g., a first arrangement) of a first group of pixels arranged in the first area 11 and the arrangement (e.g., a second arrangement) of a second group of pixels arranged in the second area 12.

Reference numeral 300-1 indicates a blowup of a specified area 300 below which the first sensor 210 and the second sensor 220 of the electronic device 100 are disposed. The blowup 300-1 in FIG. 3 may be a top view of the display panel 150 illustrated in FIG. 2, when viewed from above (e.g., the cover glass 130). According to various embodiments, the arrangement of the first group of pixels and the arrangement of the second group of pixels are not limited to those illustrated in FIG. 3.

According to an embodiment, the display panel 150 may include the first area 11 and the second area 12. The first area 11 may include the first group of pixels arranged in the first arrangement, and the second area 12 may include the second group of pixels arranged in the second arrangement.

According to an embodiment, the first group of pixels and the second group of pixels may include a first sub-pixel 153*a*, a second sub-pixel 153*b*, and a third sub-pixel 153*c*. For example, the first sub-pixel 153*a* may correspond to a pixel that emits red light, the second sub-pixel 153*b* may correspond to a pixel that emits green light, and the third sub-pixel 153*c* may correspond to a pixel that emits blue light. The first group of pixels and the second group of pixels may implement various colors of light by a combination of the sub-pixels 153*a*, 153*b*, and 153*c*.

According to an embodiment, the second group of pixels arranged in the second area 12 may be connected together or be densely arranged with an interval smaller than at least a specified size. According to various embodiments, the resolution of a screen displayed on the display panel 150 may increase with a decrease in the interval between the pixels arranged in the display panel 150 or a decrease in the sizes of the pixels. Accordingly, the screen displayed through the second area 12 may have a high resolution.

According to an embodiment, at least some of the first group of pixels arranged in the first area 11 may be spaced apart from each other by a specified distance. According to various embodiments, among the first group of pixels, the first sub-pixel 153*a*, the second sub-pixel 153*b*, and the third sub-pixel 153*c* may be connected together or spaced apart from each other in sub-pixel units.

For example, the first area 11 may be implemented with a repetition of a first row in which pixels are arranged and a second row in which no pixels are arranged. In this case, the first area 11, as illustrated in FIG. 3, may include a first opaque area 11-1*a*, a first transparent area 11-2*a*, a second opaque area 11-1*b*, and a second transparent area 11-2*b*. The pixels arranged in the first opaque area 11-1*a* may be spaced apart from the pixels arranged in the second opaque area 11-1*b* by a specified distance.

In another example, the first area 11 may be implemented with a repetition of a first column in which pixels (e.g., the first sub-pixel 153*a*, the second sub-pixel 153*b*, and the third sub-pixel 153*c*) are arranged and a second column in which pixels (e.g., the first sub-pixel 153*a*, the second sub-pixel 153*b*, and the third sub-pixel 153*c*) are not arranged. In this case, the first area 11 may include a first opaque area, a first transparent area, a second opaque area, and a second transparent area, and the pixels arranged in the first opaque area may be spaced apart from the pixels arranged in the second opaque area by a specified distance.

In another example, the first area 11 may be implemented with a repetition of a first diagonal line in which pixels (e.g., the first sub-pixel 153*a*, the second sub-pixel 153*b*, and the third sub-pixel 153*c*) are arranged and a second diagonal line in which pixels (e.g., the first sub-pixel 153*a*, the second sub-pixel 153*b*, and the third sub-pixel 153*c*) are not arranged. Even in this case, at least some of the first group of pixels arranged in the first area 11 may be spaced apart from each other by a specified distance.

In another example, pixels may be irregularly arranged in the first area 11. However, even in this case, at least some of the first group of pixels arranged in the first area 11 may be spaced apart from each other by a specified distance.

According to various embodiments, the light transmittance of the display panel 150 may increase with an increase in the interval between the pixels arranged in the display panel 150. Accordingly, the first area 11 may have a relatively high light transmittance as compared, for example, to the second area 12.

According to an embodiment, the first sensor 210 may be disposed below the display panel 150 and may receive light from outside the electronic device 100 through the first area 11. When at least part of the first sensor 210 is disposed below the transparent areas 11-2*a* and/or 11-2*b*, the first sensor 210 may receive light through the first area 11 and may perform a specified operation.

According to an embodiment, the second sensor 220 may be disposed below the display panel 150 and may obtain image data that corresponds to incident light through an opening, and/or light reflected from another sensor. The second sensor 220 may perform a specified operation by receiving light through an area over a specified range. Therefore, an opening may be formed, or at least pixels may not be arranged, in the area of the display panel 150 that corresponds to the area in which the second sensor 220 is disposed.

Figure 4:
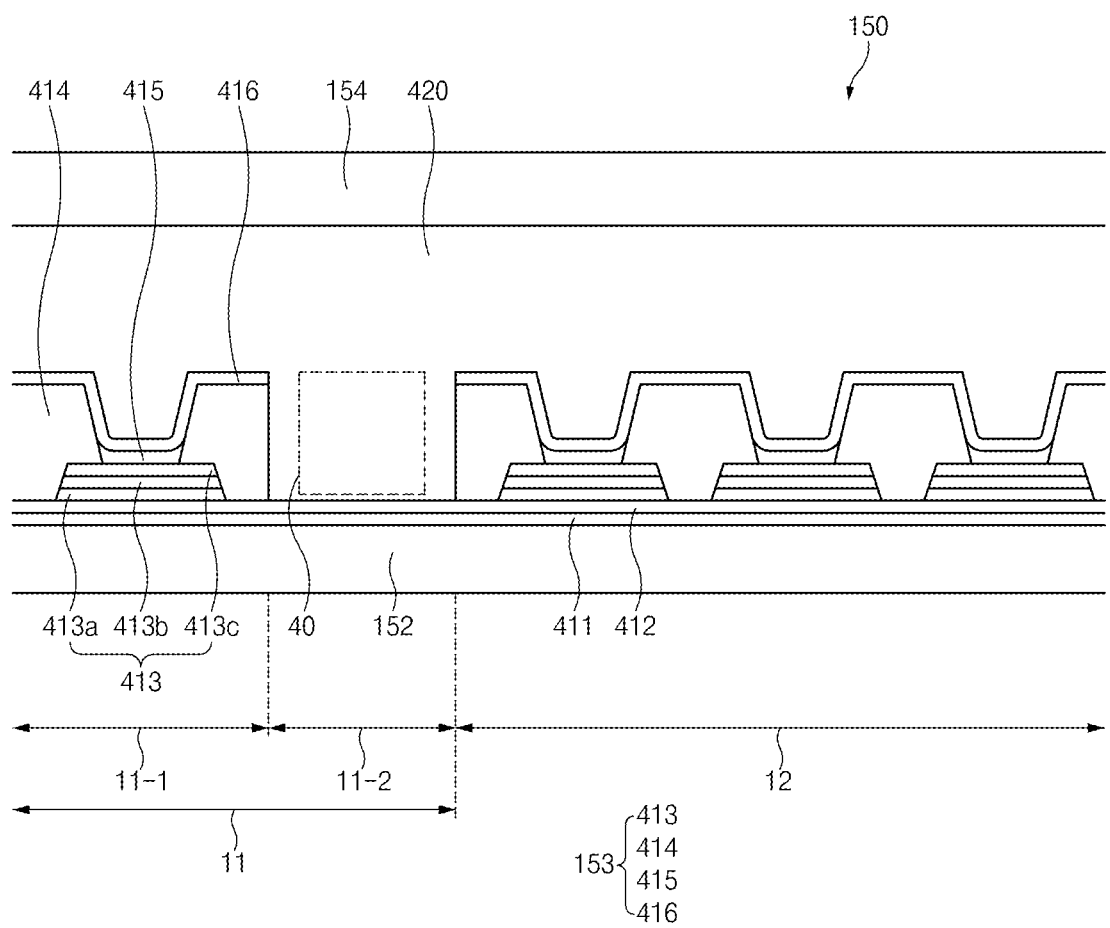
FIG. 4 is a sectional view illustrating a display panel of the electronic device that includes the first area and the second area, according to an embodiment.

FIG. 4 is a sectional view illustrating the display panel 150 of the electronic device 100 that includes the first area 11 and the second area 12, according to an embodiment.

FIG. 4 illustrates a method of manufacturing the first area 11 and the second area 12 by arranging pixels. The display panel 150 may include the first area 11 and the second area 12, and the first area 11 may include the opaque area 11-1 and the transparent area 11-2. A method of forming the display panel 150 including the transparent area 11-2 will be described below with reference to FIG. 4.

According to an embodiment, the display panel 150 may include a first substrate 152, a gate insulating film 411, a protective film 412, the light emitting elements 153, a planarization film 420, and a second substrate 154. In various embodiments, the display panel 150 may further include other components, in addition to the components illustrated. For example, the display panel 150, as illustrated in FIG. 2, may further include the PI substrate 151.

The first substrate 152 may be understood as a component identical or similar to, for example, the BP 152 illustrated in FIG. 2. The gate insulating film 411 and the protective film 412 may be sequentially laminated on the first substrate 152. The gate insulating film 411 may be formed of an inorganic insulating material, and the protective film 412 may be formed of an organic or inorganic insulating material.

The light emitting elements 153 may be formed on the protective film 412. According to an embodiment, each of the light emitting elements 153 may include an anode 413, a pixel-defining film 414, an organic light emitting layer 415, and a cathode 416.

According to an embodiment, the anode 413 may be formed of a triple film in which a first film 413a, a second film 413b, and a third film 413c are sequentially laminated. The first film 413a may be formed of indium tin oxide (ITO) or indium zinc oxide (IZO) with a relatively high work function value, among transparent conductive materials. The second film 413b may be formed of silver (Ag), aluminum (Al), magnesium (Mg), lithium (Li), calcium (Ca), aluminum-lithium (Al—Li), magnesium-indium (Mg—In), magnesium-silver (Mg—Ag), or aluminum-silver (Al—Ag) that is a metal with a relatively low work function value. The third film 413c may be formed of indium tin oxide (ITO) or indium zinc oxide (IZO).

According to an embodiment, the pixel-defining film 414 may be formed on the protective film 412 and the anode 413. The pixel-defining film 414 may have at least one opening formed therein, and a pixel area may be defined by the opening. The pixel-defining film 414 may be made of a resin such as polyacrylate resin or polyimide, or a silica-based inorganic material.

According to an embodiment, the organic light emitting layer 415 may be formed in the opening formed by the pixel-defining film 414. The organic light emitting layer 415 may be implemented with a single layer made of a light emitting material, or may be implemented with a multi-layer including a hole injection layer, a hole transport layer, an emitting material layer, an electron transport layer, and an electron injection layer in order to increase light emitting efficiency.

According to an embodiment, the cathode 416 may be formed on the organic light emitting layer 415. In an embodiment, the cathode 416 may be formed of a transparent conductive material.

According to an embodiment, after the light emitting elements 153 are formed as described above, the light emitting element 153 corresponding to the transparent area 11-2 in the first area 11 may be removed by a laser, and a space 40 may be formed in at least a partial area. In other words, the transparent area 11-2 may be formed by removing at least a part of the light emitting elements 153 that are consecutively formed as in the second area 12. The transparent area 11-2 may be removed in pixel units distinguished by the pixel-defining film 414. FIG. 4 illustrates an example that one of the consecutive light emitting elements 153 is removed. However, according to various embodiments, two or more consecutive or non-consecutive light emitting elements 153 may be removed. In this case, the range of the transparent area 11-2 may be increased.

According to an embodiment, the planarization film 420 may be formed after the space 40 is formed by removing at least a part of the light emitting elements 153. The planarization film 420 may fill the light emitting elements 153 and the formed space 40 to make the surface flat and protect the light emitting elements 153 formed on the first substrate 152 from moisture and external shocks. In an embodiment, the planarization film 420 may be formed of an organic or inorganic material, or may be formed in a form in which organic and inorganic materials are alternately stacked.

According to an embodiment, the second substrate 154 may be formed on the planarization film 420. In an embodiment, the second substrate 154 may be understood as a component identical or similar to the thin film encapsulation 154 illustrated in FIG. 2. The second substrate 154 may seal off and protect the light emitting elements 153 formed on the first substrate 152 from the outside. According to another embodiment, the second substrate 154 may be omitted to reduce the thickness of the display panel 150. For example, the planarization film 420 may protect the light emitting elements 153 from the outside in place of the second substrate 154. According to an embodiment, a touch sensor for receiving a user's touch input may be disposed on the planarization film 420 or the second substrate 154.

Figure 5A:
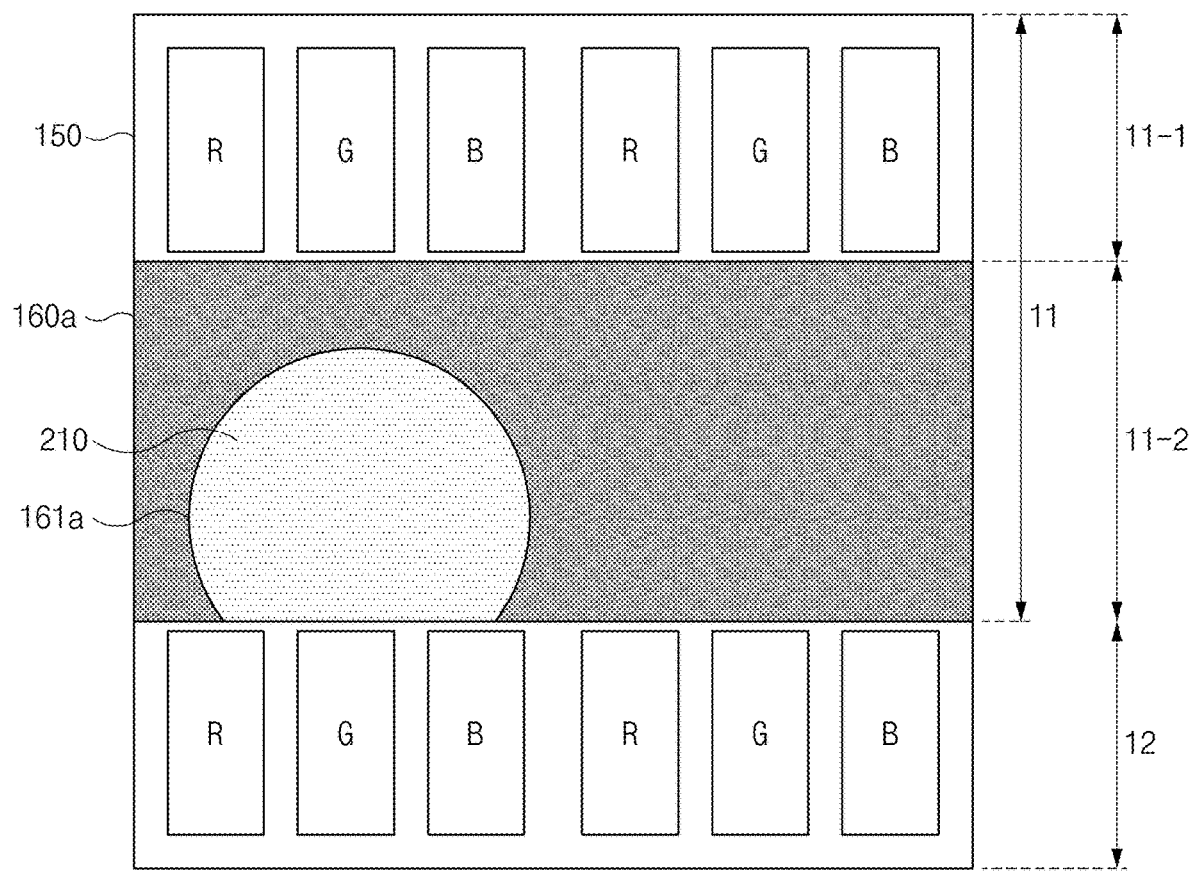
FIGS. 5A and 5B are diagrams illustrating various embodiments in which the first sensor is disposed below the first area of the display in the electronic device.
Figure 5B:
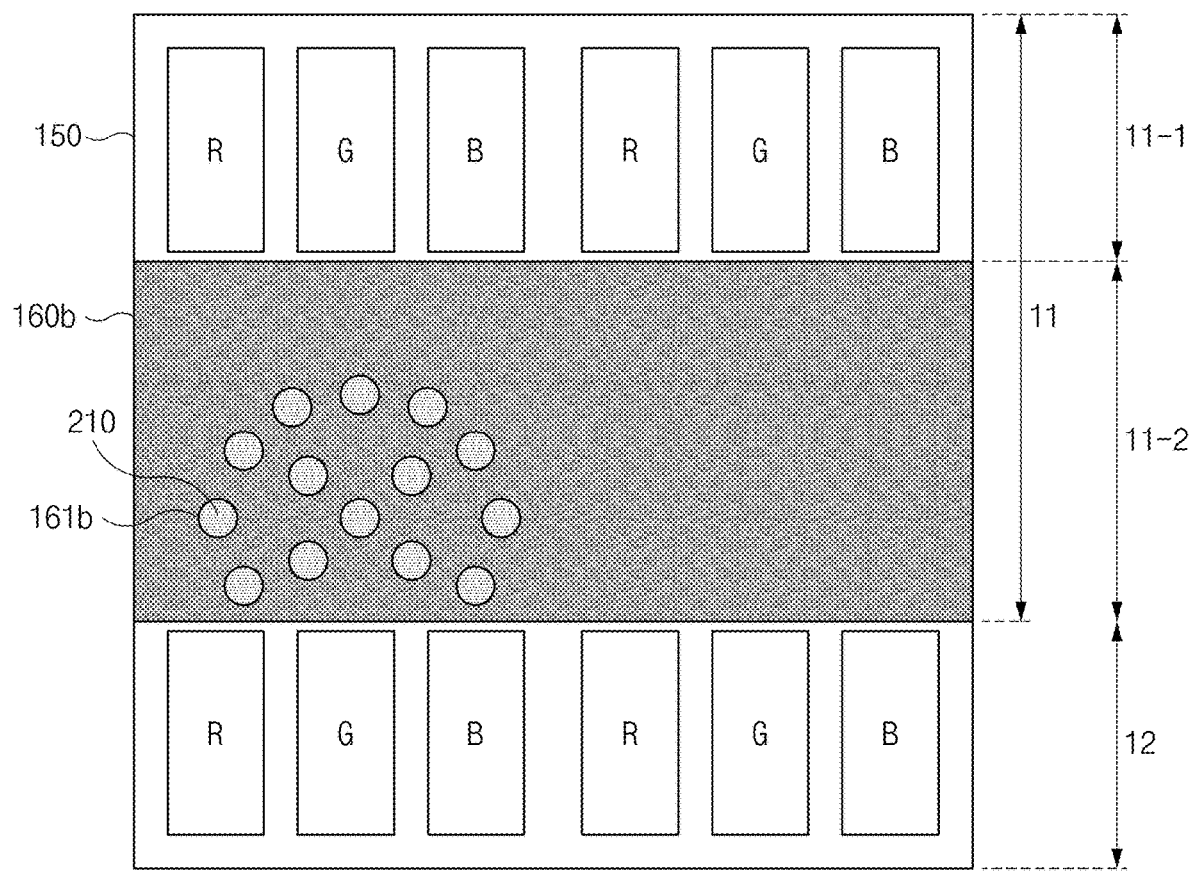

FIGS. 5A and 5B are diagrams illustrating various embodiments in which the first sensor 210 is disposed below the first area 11 of the display 120 in the electronic device 100.

Referring to FIGS. 5A and 5B, the display panel 150 may include the first area 11. The first area 11 may include the opaque area 11-1 in which pixels are arranged and the transparent area 11-2 in which no pixels are arranged. According to an embodiment, the first sensor 210 may be disposed below the first area 11, and at least part of the first sensor 210 may be disposed below the transparent area 11-2.

According to an embodiment, as illustrated in FIG. 2, the display 120 may include a cushion layer 160a or 160b, and the cushion layer 160a or 160b may be disposed between the display panel 150 and the first sensor 210.

According to an embodiment, the cushion layer 160a or 160b may include at least one of a light shielding layer (e.g., an EMBO layer) and a buffer layer (e.g., a sponge layer). Since the light shielding layer or the buffer layer has a light transmittance lower than a specified level, it may be difficult for the first sensor 210 disposed below the light shielding layer or the buffer layer to receive light from outside the electronic device 100. According to various embodiments, at least part of the cushion layer 160a or 160b may be removed to allow the first sensor 210 to emit light to the outside and/or receive light from the outside.

According to an embodiment, a partial area 161a of the cushion layer 160a that corresponds to the area in which the first sensor 210 is disposed may be removed as illustrated in FIG. 5A. In this case, the first sensor 210 may emit light to the outside, or receive light from the outside, through the removed area 161a and the first area 11 of the display panel 150.

According to another embodiment, a plurality of openings 161b, as illustrated in FIG. 5B, may be formed in an area of the cushion layer 160b that corresponds to the area in which the first sensor 210 is disposed. In this case, the first sensor 210 may emit light to the outside, or receive light from the outside, through the plurality of openings 161b and the first area 11 of the display panel 150.

In the case of FIG. 5A, the area through which light is emitted to and/or received from the outside may be larger than that in the case of FIG. 5B, and therefore the first sensor may have high light emitting efficiency or high light receiving efficiency. In the case of FIG. 5B, the area of the first sensor 210 that is visible from outside the electronic device 100 may be smaller than that in the case of FIG. 5A. Therefore, more excellent visibility may be provided to a user. According to various embodiments, the sizes and shapes of the areas removed from the cushion layers 160a and 160b may be optimally determined in view of light emitting or receiving efficiency and visibility.

According to various embodiments, a blocking member may be disposed between the display panel 150 and the cushion layer 160a or 160b in view of the user's visibility. The blocking member may include, for example, an IR shielding film or a polarizer film that blocks or polarizes a specified wavelength of light.

FIGS. 6A, 6B, 6C, and 6D are diagrams illustrating various embodiments in which an opening is formed in the display 120 of the electronic device 100 and the second sensor 220 is disposed in the opening.

Referring to FIGS. 6A, 6B, 6C and 6D, the display 120 may include a plurality of layers. According to an embodiment, the display 120 may include the cushion layer 160, the display panel 150, the polarization layer 140, and the cover glass 130. According to various embodiments, the display 120 may further include other components, in addition to the components illustrated, or may not include some of the components illustrated.

Figure 6A:
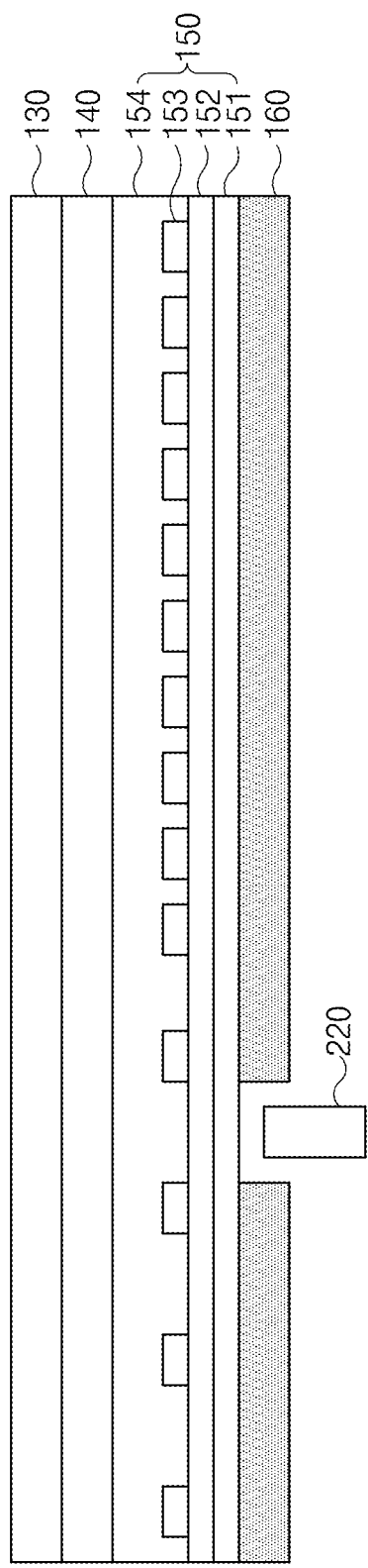
FIGS. 6A, 6B, 6C, and 6D are diagrams illustrating various embodiments in which an opening is formed in the display of the electronic device and the second sensor is disposed in the opening.

Referring to FIG. 6A, an opening may be formed in the cushion layer 160 among the plurality of layers included in the display 120. In an embodiment, the second sensor 220 may obtain image data that corresponds to incident light through the opening.

In the case where the opening is formed in only the cushion layer 160, the area in which the opening is formed may be an area in which the light emitting elements 153 are not arranged. For example, the area in which the opening is formed may be the transparent area 11-2 in the first area 11 illustrated in FIG. 3.

Figure 6B:
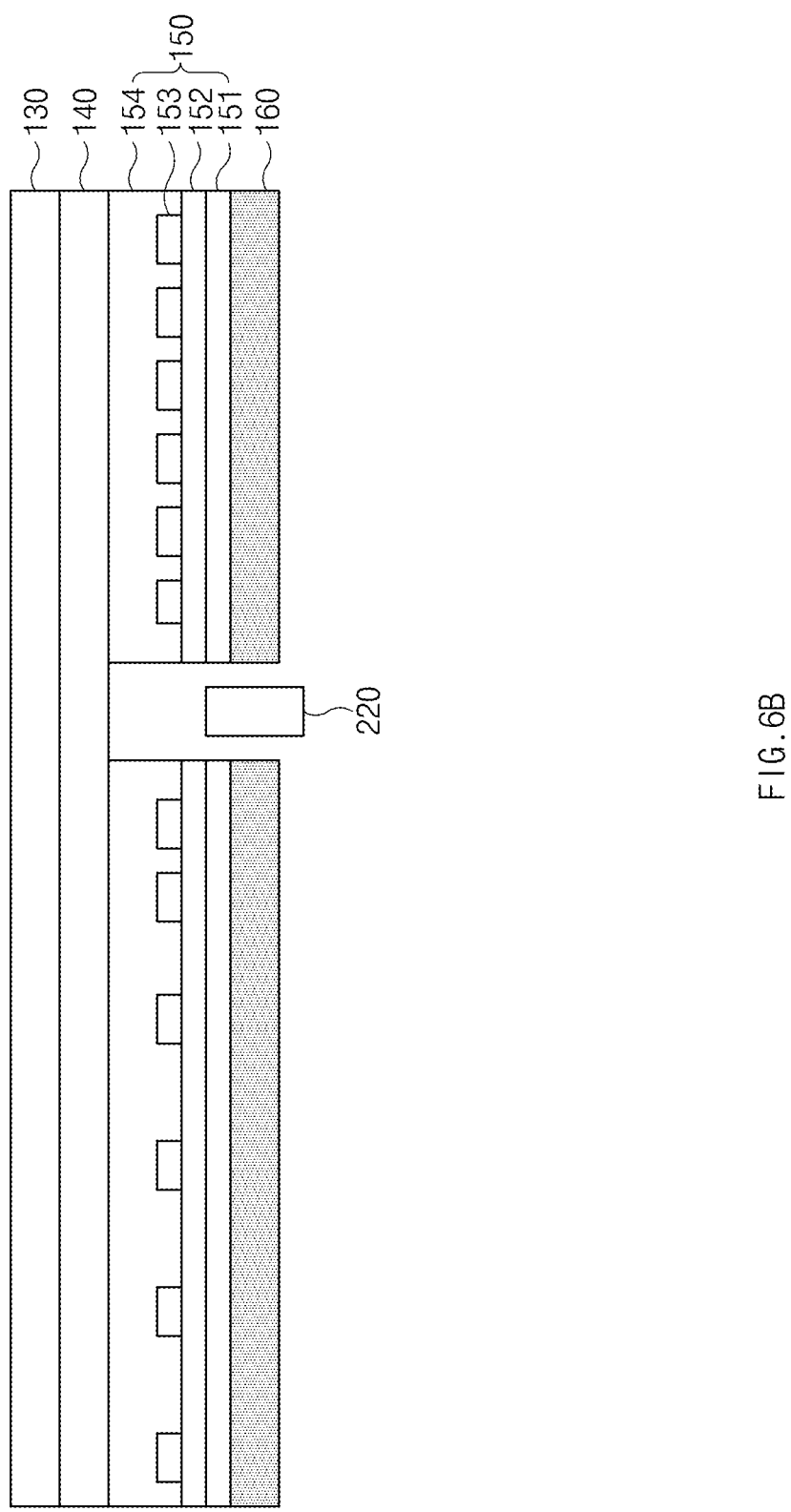

Referring to FIG. 6B, an opening may be formed in the cushion layer 160 and the display panel 150 among the plurality of layers included in the display 120. According to an embodiment, in the case where the opening is formed in the display panel 150, the opening may be formed in all of the PI substrate 151, the BP 152, the light emitting elements 153, and the thin film encapsulation 154. In an embodiment, the second sensor 220 may obtain image data that corresponds to incident light through the opening.

In the case where the opening is formed in the cushion layer 160 and the display panel 150, the area in which the opening is formed may be irrelevant to whether the light emitting elements 153 are arranged or not. For example, the opening may be formed in the first area 11 illustrated in FIG. 3, or may be formed in the second area 12. In another example, the opening may be formed over the boundary between the first area 11 and the second area 12.

Figure 6C:
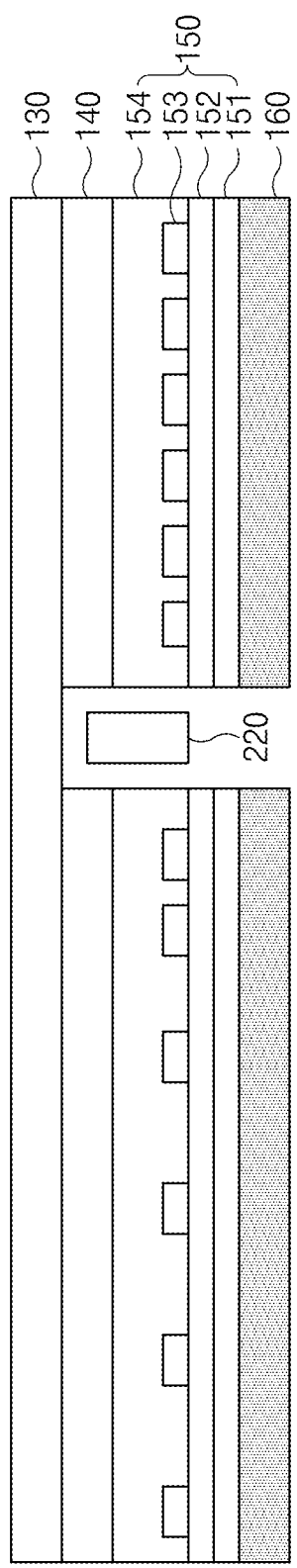

Referring to FIG. 6C, an opening may be formed in the cushion layer 160, the display panel 150, and the polarization layer 140 among the plurality of layers included in the display 120. In an embodiment, the second sensor 220 may obtain image data that corresponds to incident light through the opening.

Since the layers in which the opening is formed include the display panel 150 even in the case of FIG. 6C, the area in which the opening is formed may be irrelevant to whether the light emitting elements 153 are arranged or not. For example, the opening may be formed in the first area 11 illustrated in FIG. 3, or may be formed in the second area 12. In another example, the opening may be formed over the boundary between the first area 11 and the second area 12.

Figure 6D:
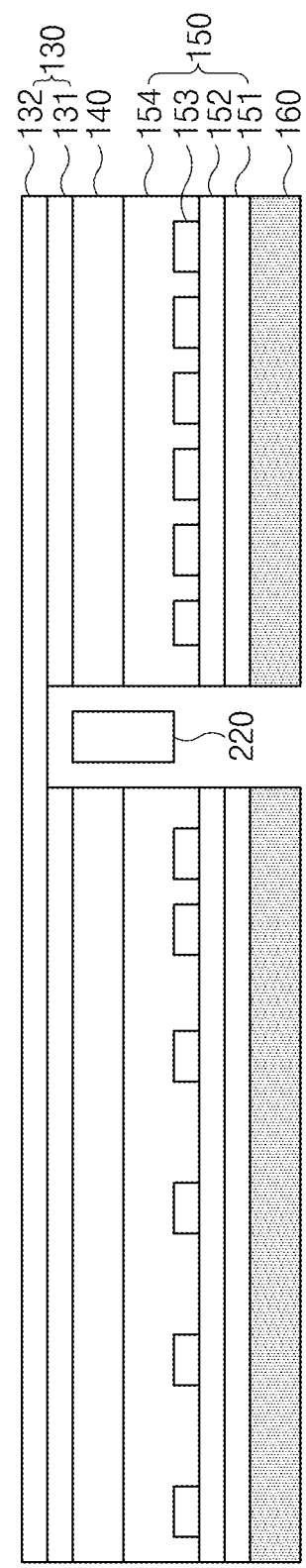

Referring to FIG. 6D, in an embodiment, the cover glass 130 may include a flexible cover glass 131 and a rigid cover glass 132. According to an embodiment, an opening may be formed in the cushion layer 160, the display panel 150, the polarization layer 140, and the flexible cover glass 131 among the plurality of layers included in the display 120. In the case where the opening is formed in the flexible cover glass 131 and the second sensor 220 is disposed in the opening, the rigid cover glass 132 may fix the second sensor 220 in a specified position since the rigid cover glass 132 is disposed on the flexible cover glass 131. In an embodiment, the second sensor 220 may obtain image data that corresponds to incident light through the opening.

Since the layers in which the opening is formed include the display panel 150 even in the case of FIG. 6D, the area in which the opening is formed may be irrelevant to whether the light emitting elements 153 are arranged or not. For example, the opening may be formed in the first area 11 illustrated in FIG. 3, or may be formed in the second area 12. In another example, the opening may be formed over the boundary between the first area 11 and the second area 12.

According to various embodiments, as illustrated in FIGS. 6A, 6B, 6C and 6D, the second sensor 220 may be disposed in or below the openings, or part of the second sensor 220 may be disposed in the openings and the remaining part of the second sensor 220 may be disposed below the openings.

Figure 7:
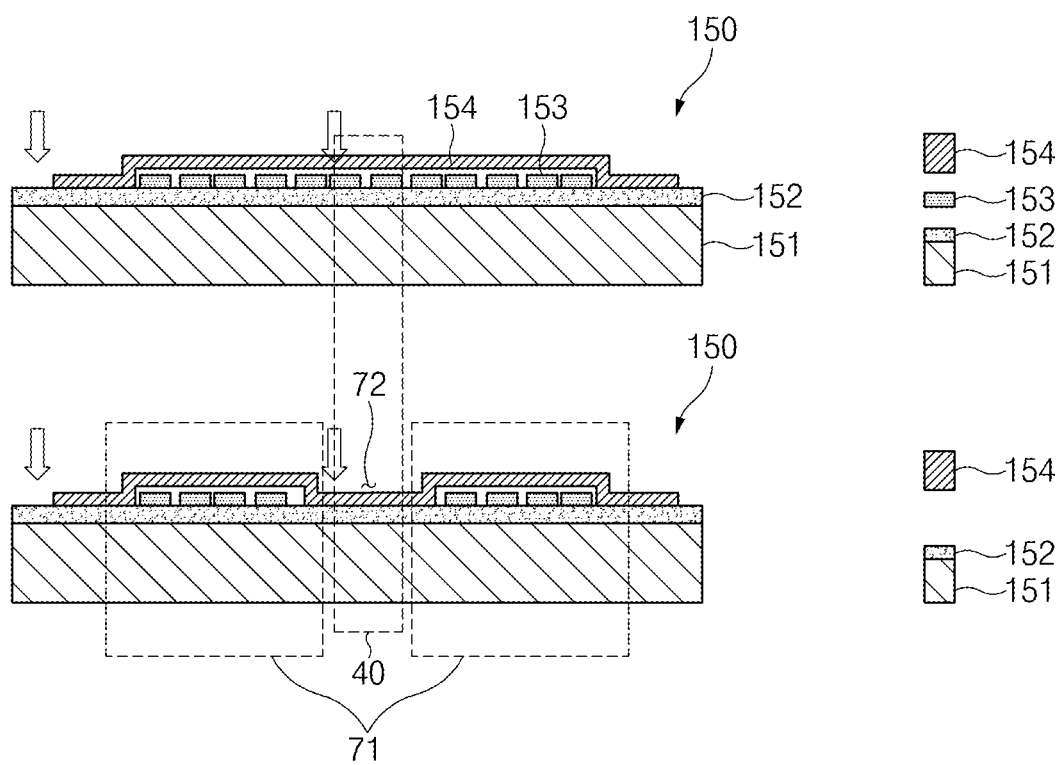
FIG. 7 is a diagram illustrating a method of forming an opening in the display panel of the electronic device according to an embodiment.

FIG. 7 is a diagram illustrating a method of forming an opening in the display panel 150 of the electronic device 100 according to an embodiment.

Referring to FIG. 7, the display panel 150 may include the PI substrate 151, the BP 152, the light emitting elements 153, and the thin film encapsulation 154. In an embodiment, the display panel 150 may include an area 71 in which no opening is formed and an area 72 in which an opening is formed.

According to various embodiments, in the case where the opening is formed in the display panel 150, a method for preventing and/or reducing the organic light emitting layers 415 included in the light emitting elements 153 from being exposed external moisture or air may be considered. For example, as will be described below, the opening may be formed after a transparent area (e.g., the transparent area 11-2 of FIG. 2) is formed in the display panel 150.

First, the light emitting elements 153 illustrated in FIG. 4, which include the cathode 416, the anode 413, and the organic light emitting layer 415, may be deposited on the BP 152 that is a buffer layer. Next, in order to form a transparent area, the light emitting elements 153 exposed on one surface may be subjected to laser etching. The range in which the laser etching is performed may vary depending on the range of the transparent area to be formed. Then, the thin film encapsulation 154 may be deposited on the light emitting elements 153 on which the laser etching has been performed. After that, an opening may be formed by performing laser cutting or punching on at least part of the transparent area.

According to an embodiment, in the case where an opening, unlike that described above, is directly formed without a transparent area, the light emitting elements 153 may be damaged due to infiltration of external moisture. That is because the thin film encapsulation 154 is removed due to the opening and therefore sides of the light emitting elements 153 are not enclosed by the thin film encapsulation 154.

On the other hand, in the case where an opening, as described above, is formed after a transparent area is formed, sides of the light emitting elements 153 may be enclosed by the thin film encapsulation 154 and protected from external moisture.

Figure 8A:
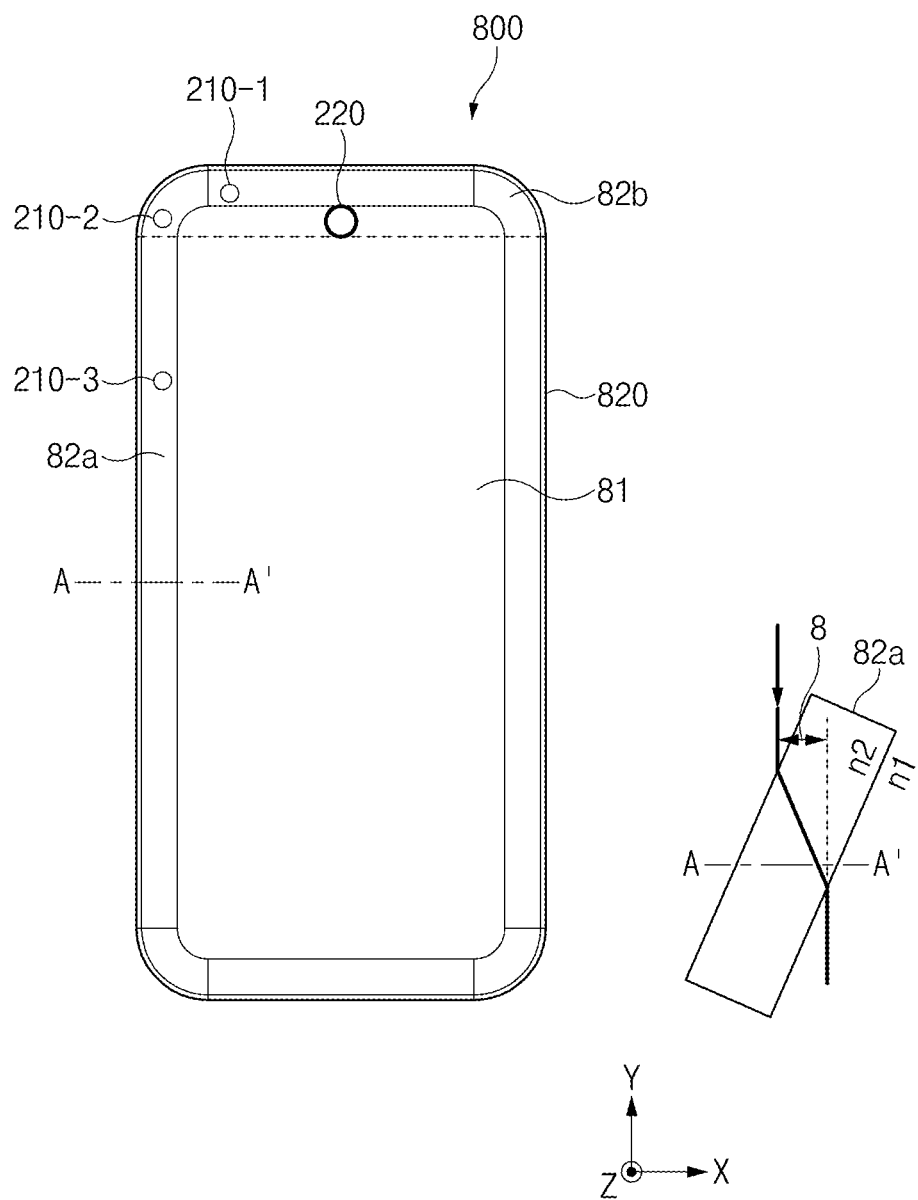
FIG. 8A is a diagram illustrating an electronic device including curved areas, according to an embodiment.

FIG. 8A is a diagram illustrating an electronic device 800 including curved areas 82a and 82b according to an embodiment.

Referring to FIG. 8A, the front side of the electronic device 800 may include a substantially flat area 81 and the curved areas 82a and 82b. In an embodiment, the substantially flat area 81 may be understood as including an area having a flat surface and an area having a surface curved with a curvature smaller than a specified level in a specified direction. In an embodiment, the curved areas 82a and 82b may be understood as areas having a surface, at least part of which is curved with a curvature larger than the specified level in a specified direction. According to an embodiment, the curvature smaller than the specified level may be understood as a level at which, even though the path of light passing through the front side is modified by the curved area, the second sensor is capable of correcting the modified light path.

According to an embodiment, in the case where the front side of the electronic device 800 has the curved areas 82a and 82b as illustrated in FIG. 8A, a display 810 of the electronic device 800 that includes a cover glass, a display panel, and the like may have the same curved areas as, or curved areas similar to, the curved areas 82a and 82b.

According to an embodiment, the curved areas 82a and 82b may be formed on the periphery of the display 810. For example, the substantially flat area 81 may be formed in the center of the display 810, and the curved areas 82a and 82b may be formed at the outside edges of the substantially flat area 81. According to various embodiments, as illustrated in FIG. 8A, the curved areas 82a and 82b may include the first curved areas 82a located near the edges of the electronic device 800 and the second curved areas 82b located near the vertices of the electronic device 800.

The first curved areas 82a may be, for example, areas in which at least one component of a vector indicating a curved direction from the substantially flat area 81 includes a constant of "0". For example, the first curved areas 82a illustrated in FIG. 8A may be curved in a direction (x, 0, −z) from the substantially flat area 81 (z being a positive number). In another example, the first curved areas 82a may be curved in a direction (0, y, −z) from the substantially flat area 81 (z being a positive number).

The second curved areas 82b may be, for example, areas in which a component of a vector indicating a curved direction from the substantially flat area 81 does not include a constant of "0". For example, the second curved areas 82b illustrated in FIG. 8A may be curved in a direction (x, y, −z) from the substantially flat area 81 (z being a positive number).

In various embodiments, first sensors 210-1, 210-2, and 210-3 may be disposed below the curved areas 82a and 82b. For example, the first sensors 201-1 and 201-3 may be disposed below the first curved areas 82a. In another example, the first sensor 201-2 may be disposed below the second curved areas 82b. In various embodiments, the first sensors 210-1, 210-2, and 210-3 may receive light through a first area (e.g., the first area 11 of FIG. 2), and therefore at least some of the first sensors 210-1, 210-2, and 210-3 may be disposed in areas that correspond to the first area and the curved areas 82a and 82b.

Referring to a sectional view of the first curved area 82a taken along line A-A', the refractive index of the first curved area 82a may be denoted by n2, and the refractive index of a medium outside the first curved area 82a may be denoted by n1. Since n2 is generally larger than n1, light passing through the first curved area 82a may be refracted as illustrated in FIG. 8A.

According to an embodiment, the amount of light incident on the curved areas 82a and 82b may be increased according to Snell's law. For example, since vertically incident light rays within a first range 8, as illustrated in FIG. 8A, are all refracted and concentrated on a single point, the amount of light received by the first sensors 201-1, 210-2, and 210-3 may be increased. Therefore, when disposed below the curved areas 82 and 82b, the first sensors 201-1, 210-2, and 210-3 may be more advantageous for receiving light than when disposed below the substantially flat area 81.

According to an embodiment, when light passing through the cover glass is incident on the second sensor 220 through an opening, the second sensor 220 may obtain image data that corresponds to the incident light. If the second sensor 220 is disposed below the curved areas 82a and 82b, light may be refracted by the curved areas 82a and 82b of the cover glass and the image data may be distorted. Therefore, it may be more advantageous for the second sensor 220 to be disposed below the substantially flat area 81 rather than the curved areas 82a and 82b. Accordingly, the opening required for the second sensor 220 to obtain image data may be formed in an area of a layer included in the display 810 that corresponds to the substantially flat area 81.

Figure 8B:
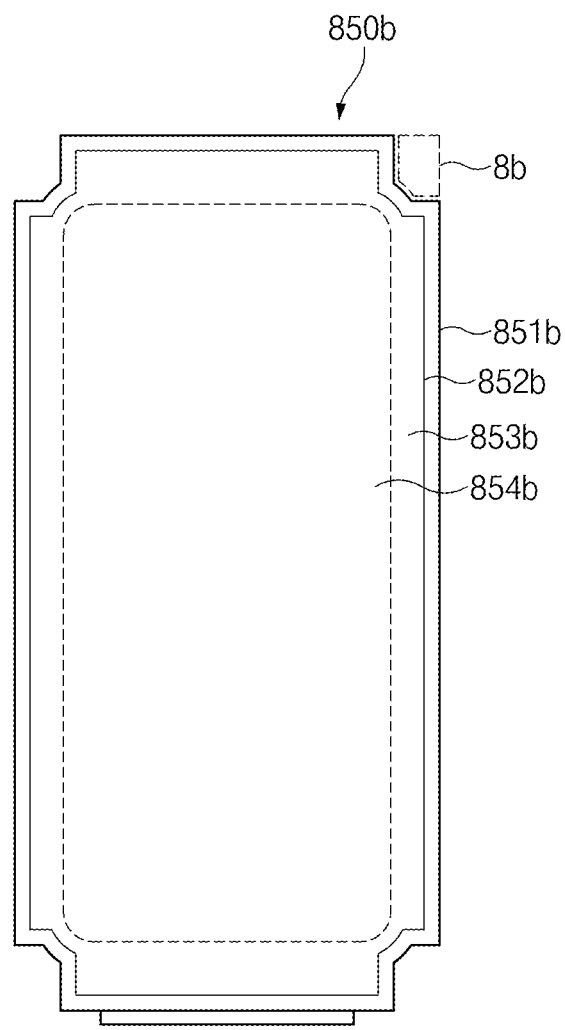
FIGS. 8B and 8C are diagrams illustrating display panels of the electronic device that include curved areas, respectively, according to various embodiments.
Figure 8C:
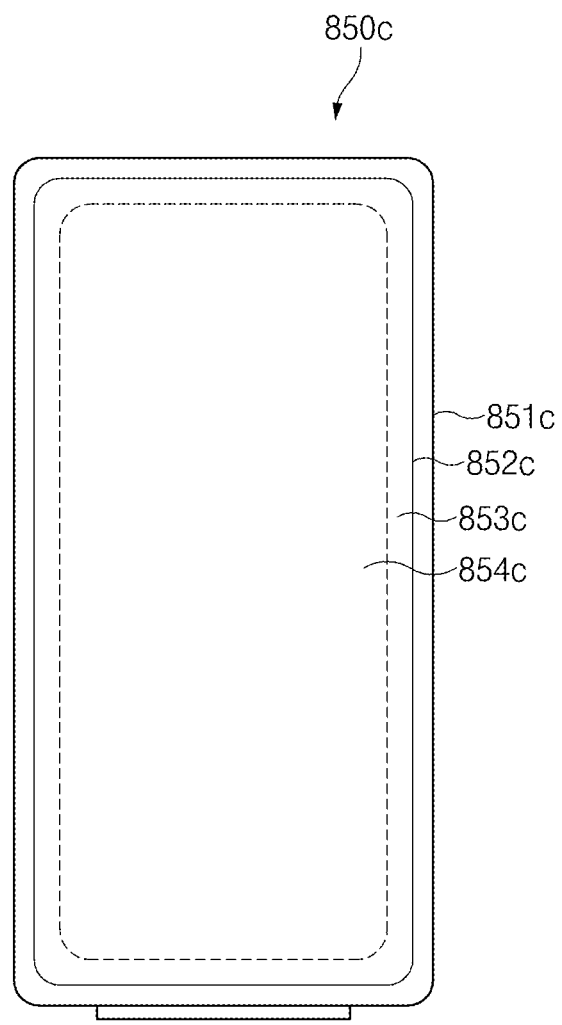

FIGS. 8B and 8C are diagrams illustrating display panels 850b and 850c of the electronic device 800 that include curved areas 853b and 853c, respectively, according to various embodiments.

Referring to FIGS. 8B and 8C, the display panels 850b and 850c may include active areas 852b and 852c and inactive areas 851b and 851c, respectively. According to an embodiment, the active areas 852b and 852c, in which pixels are arranged, may be areas through which a user is capable of recognizing a screen displayed. According to an embodiment, the inactive areas 851b and 851c, in which no pixels are arranged, may be located on the peripheries of the active areas 852b and 852c. The user may recognize the inactive areas 851b and 851c as black lines.

According to various embodiments, in the case where the electronic device 800, as illustrated in FIG. 8A, includes the substantially flat area 81 and the curved areas 82a and 82b, the active areas 852b and 852c of the display panels 850b and 850c may also include substantially flat areas 854b and 854c and the curved areas 853b and 853c, respectively. The curved areas 853b and 853c of the display panels 850b and 850c may be curved in specified direction from the substantially flat areas 854b and 854c of the display panels 850b and 850c.

According to various embodiments, the shapes of the display panels 850b and 850c may be the same as, or different from, the external appearance of the electronic device 800. For example, as illustrated in FIG. 8B, at least part near each vertex of the display panel 850b may be removed. In this case, components included in the electronic device 800 may be mounted in the removed areas 8b. In another example, as illustrated in FIG. 8C, the shape of the display panel 850c may be the same as the external appearance of the electronic device 800.

According to various embodiments, the shapes of the display panels 850b and 850c are not limited to those illustrated in FIGS. 8B and 8C. For example, the display panels 850b and 850c may have a shape in which at least part of the curved areas 853b and 853c is removed.

Figure 9A:
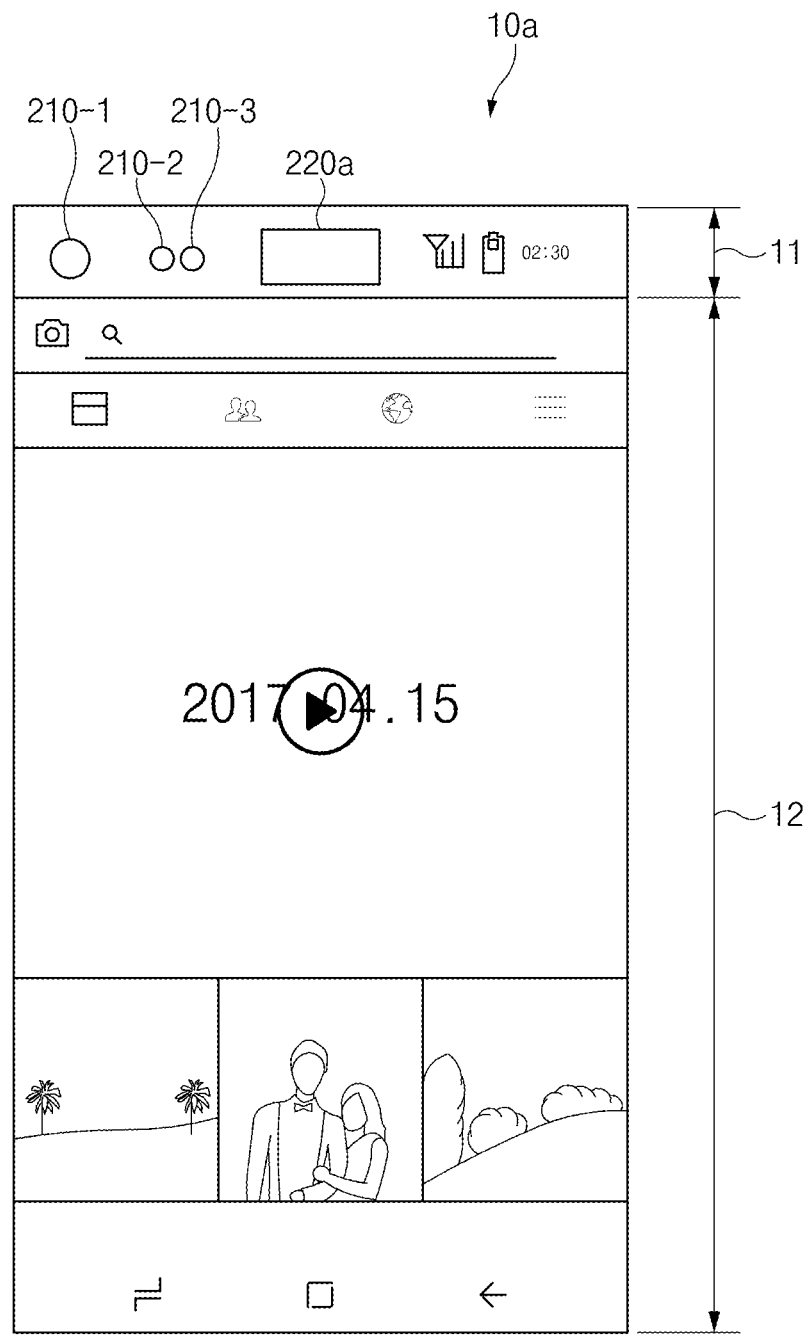
FIGS. 9A and 9B are diagrams illustrating screens displayed on the electronic device including the first area and the second area, according to various embodiments.
Figure 9B:
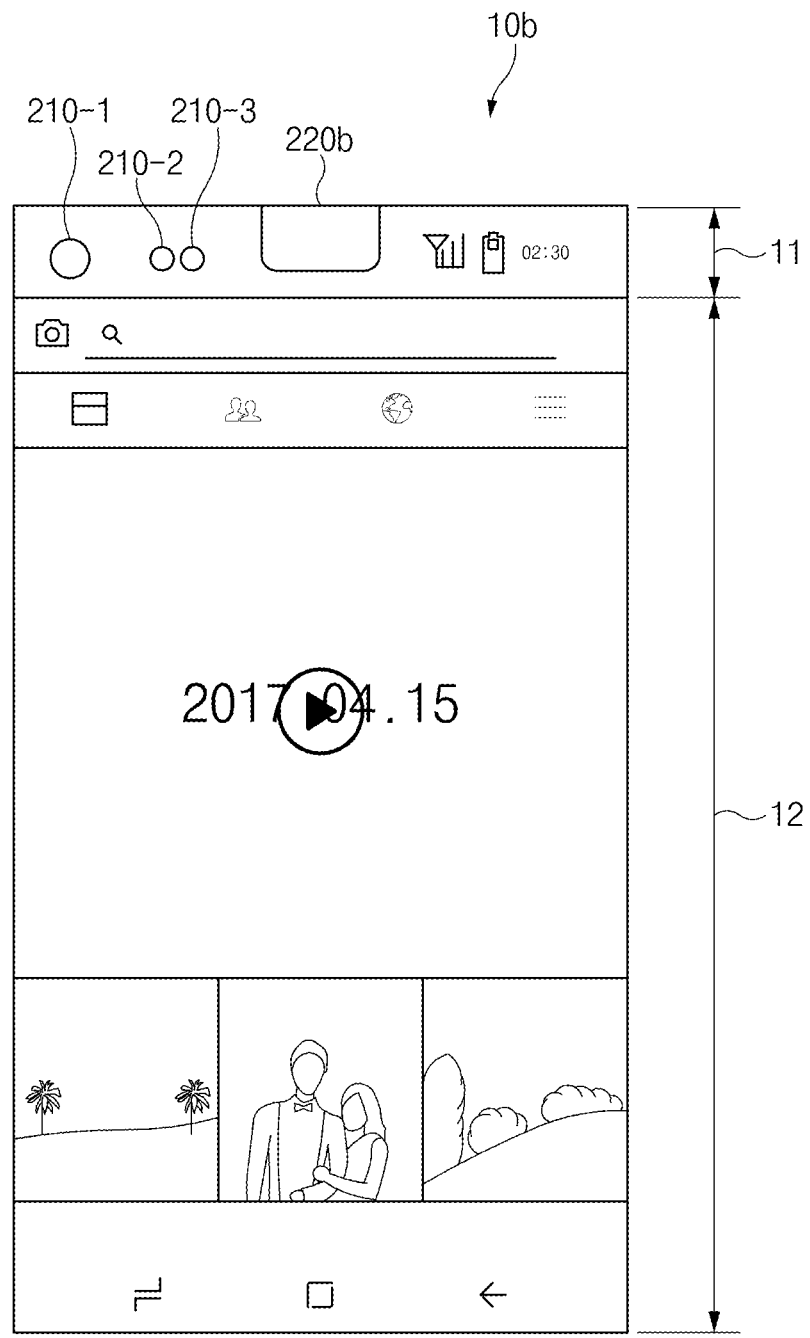

FIG. 9A is a diagram illustrating a screen displayed on the electronic device 100 including the first area 11 and the second area 12, according to an embodiment. FIG. 9B is a diagram illustrating a screen displayed on the electronic device 100 including the first area 11 and the second area 12, according to another embodiment.

Referring to FIGS. 9A and 9B, an active area 10a or 10b of the electronic device 100 may include the first area 11 and the second area 12. According to an embodiment, a first sensor may be disposed below the first area 11. In an embodiment, a plurality of first sensors 210-1, 201-2, and 210-3 may be provided. The first sensors 210-1, 201-2, and 210-3 may emit light to the outside and/or may receive light from the outside. The first sensors 210-1, 201-2, and 210-3 may include, for example, and without limitation, an illuminance sensor, a proximity sensor, and/or an iris sensor, or the like. According to an embodiment, a second sensor 220a or 220b may be disposed below at least part of the first area 11 and/or the second area 12.

According to an embodiment, the second sensors 220a and 220b may be disposed in various ways. For example, referring to FIG. 9A, the second sensor 220a may be disposed below the center of the first area 11. In this case, pixels may be arranged around the second sensor 220a to display a specified screen. In another example, referring to FIG. 9B, the second sensor 220b may be disposed below the first area 11 so as to be adjacent to an edge of the active area 10b when viewed from above. In this case, pixels may not be disposed in the area adjacent to the edge of the active area 10b, among the surrounding areas of the second sensor 220b. In another example, unlike that illustrated in FIG. 9A or 9B, a second sensor (e.g., the second sensor 220a) may be disposed such that at least part thereof is located below the second area 12.

According to an embodiment, the electronic device 100 may include a display driver IC (e.g., the display driver IC 180 of FIG. 2). The display driver IC may transmit image signals to the display panel 150, and a screen based on the transmission of the image signals may be displayed on the active area 10 of the display 120.

According to an embodiment, the display driver IC may transmit a first image signal to the first area 11 and a second image signal to the second area 12. For example, the display driver IC may transmit different image signals to the first area 11 and the second area 12.

According to an embodiment, the first image signal may be a signal for indicating the status of the electronic device 100, and the second image signal may be a signal for displaying an execution screen of an application. In this case, a screen indicating the status of the electronic device 100 may be displayed on the first area 11. For example, a screen indicating the strength of a signal received, the battery level, the current time, and the like may be displayed on the first area 11.

According to an embodiment, the screen displayed on the first area 11 may be associated with part of a screen displayed on the second area 12. For example, the screen on the first area 11 may be displayed in the same color as that of a section of the screen on the second area 12 that is near the boundary between the first area 11 and the second area 12.

According to an embodiment, the first image signal transmitted to the first area 11 may include information associated with an execution screen of an application displayed on the second area 12. For example, the first image signal may include color information of the application execution screen. In another example, the first image signal may include information about an icon capable of controlling the execution of the application.

Figure 10:
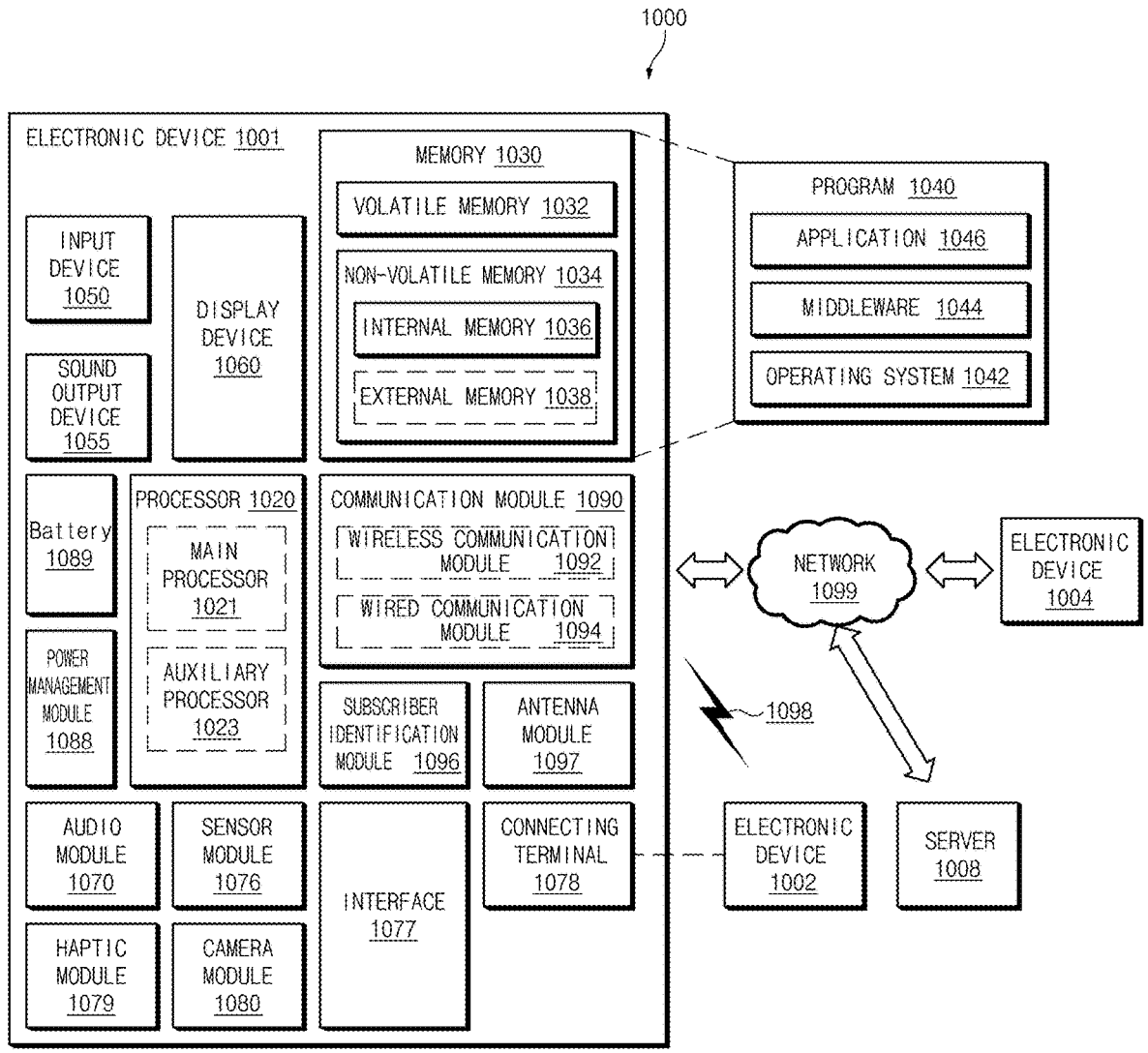
FIG. 10 is a block diagram illustrating an electronic device in a network environment according to various embodiments, where the electronic device includes a sensor for generating image data using incident light through an opening formed in a display.

FIG. 10 is a block diagram of an electronic device 1001 in a network environment 1000 according to various embodiments.

Referring to FIG. 10, the electronic device 1001 may communicate with an electronic device 1002 through a first network 1098 (e.g., a short-range wireless communication) or may communicate with an electronic device 1004 or a server 1008 through a second network 1099 (e.g., a long-distance wireless communication) in the network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the auxiliary processor 1023 may operate separately from the main processor 1021 or embedded.

In this case, the auxiliary processor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the auxiliary processor 1023 (e.g., the image signal processor or the communication processor) may be implemented as a part of another component (e.g., the camera module 1080 or the communication module 1090) that is functionally related to the auxiliary processor 1023. The memory 1030 may store a variety of data used by at least one component (e.g., the processor 1020 or the sensor module 1076) of the electronic device 1001, for example, software (e.g., the program 1040) and input data or output data with respect to commands associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone, a mouse, or a keyboard.

The sound output device 1055 may be a device for outputting a sound signal to the outside of the electronic device 1001 and may include, for example, a speaker used for general purposes, such as multimedia play or recordings play, and a receiver used only for receiving calls. According to an embodiment, the receiver and the speaker may be either integrally or separately implemented.

The display device 1060 may be a device for visually presenting information to the user of the electronic device 1001 and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connecting terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi direct, or an IrDA (infrared data association)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

Figure 11:
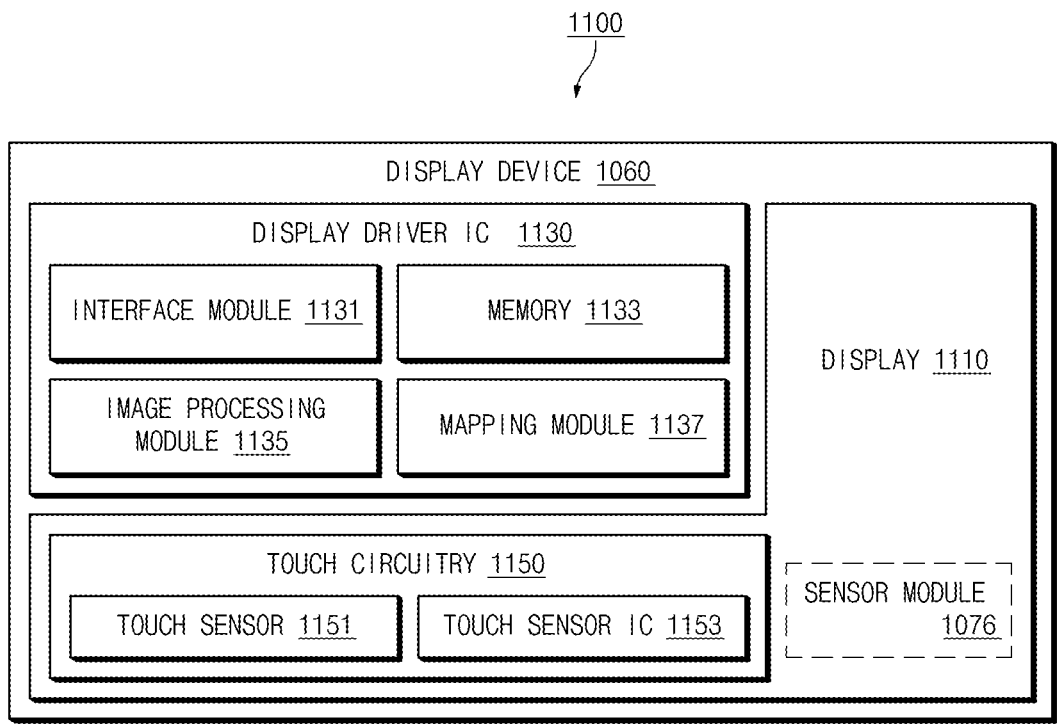
FIG. 11 is a block diagram illustrating a display device according to various embodiments.

FIG. 11 is a block diagram of the display device 1060 according to various embodiments.

Referring to FIG. 11, the display device 1060 may include a display 1110 and a display driver IC (DDI) 1130 for controlling the display 1110. The DDI 1130 may include an interface module 1131, a memory 1133 (e.g., a buffer memory), an image processing module 1135, or a mapping module 1137. For example, the DDI 1130 may receive image information including image data or an image control signal corresponding to a command for controlling the image data from a processor 1020 (e.g., a main processor 1021 or an application processor) or an auxiliary processor 1023, which is operated independently of the main processor 1021, through the interface module 1131. The DDI 1130 may communicate with a touch circuit 1150, the sensor module 1076, or the like through the interface module 1131. In addition, the DDI 1130 may store at least a part of the received image information in the memory 1133, for example, in units of frames. For example, the image processing module 1135 may perform preprocessing or post-processing (e.g., adjustment of resolution, brightness, or size) on at least a part of the image data based at least partially on characteristics of the image data or the display 1110. The mapping module 1137 may convert the image data preprocessed or post-processed through the image processing module 1135 into a voltage value or a current value capable of driving the pixels, based at least partially on attributes of the pixels of the display 1110 (e.g., an array of pixels (RGB stripe or pentile) or a size of each of subpixels). For example, at least some pixels of the display 1110 may be driven based on the voltage or current value, such that visual information (e.g., a text, an image, or an icon) corresponding to the image data is displayed on the display 1110.

According to an embodiment, the display device 1060 may further include the touch circuit 1150. The touch circuit 1150 may include a touch sensor 1151 and a touch sensor IC 1153 for controlling the touch sensor 1151. The touch sensor IC 1153 may controls the touch sensor 1151 to measure, for example, a change in a signal (e.g., a voltage, a light amount, a resistance, or a charge amount) at a specific position of the display 1110 to sense a touch input or a hovering input, and may provide information (e.g., a location, an area, a pressure or a time) about the sensed touch input or hovering input to the processor 1020. According to an embodiment, at least a part (e.g., the touch sensor IC 1153) of the touch circuit 1150 may be included as a part of the display driver IC 1130 or the display 1110, or as a part of another component (e.g., the auxiliary processor 1023) arranged outside the display device 1060.

According to an embodiment, the display device 1060 may further include at least one sensor (e.g., a fingerprint sensor, an iris sensor, a pressure sensor or an illuminance sensor) of the sensor module 1076, or a control circuitry thereof. In this case, the at least one sensor or the control circuitry thereof may be embodied in a part (e.g., the display 1110 or the DDI 1130) of the display device 1060 or a part of the touch circuit 1150. For example, when the sensor module 1076 embedded in the display device 1060 includes a biometric sensor (e.g., a fingerprint sensor), the biometric sensor may obtain biometric information associated with a touch input through an area of the display 1110. As another example, when the sensor module 1076 embedded in the display device 1060 includes a pressure sensor, the pressure sensor may obtain information about a pressure corresponding to a touch input through an area or entire area of the display 1110. According to an embodiment, the touch sensor 1151 or the sensor module 1076 may be arranged between pixels of the pixel layer of the display 1110, or above or below the pixel layer.

According to the various example embodiments of the present disclosure, the active area of the display may be increased. Accordingly, it is possible to provide more excellent design aesthetics and convenience of use to a user. Furthermore, according to the embodiments of the present disclosure, it is possible to reduce visual discomfort that the user feels.

An electronic device according to an embodiment may include a display that includes a first area including a plurality of first pixels arranged with a first density and a second area including a plurality of second pixels arranged with a second density, wherein the display includes at least one layer having an opening formed in at least part of the first area and at least part of the second area, a first sensor that detects incident light through at least part of the first area, and a second sensor that generates image data using incident light through the opening.

According to an embodiment, the opening may be formed in the at least part of the first area, and the at least one layer may include a cushion layer.

According to an embodiment, the at least one layer may include at least one of a cushion layer and/or a display panel layer. In an embodiment, the at least one layer may further include a polarization layer. In an embodiment, the at least one layer may further include a flexible cover glass layer, and the display may further include a rigid cover glass layer disposed on the flexible cover glass layer.

According to an embodiment, the first area may have a light transmittance greater than a specified magnitude.

According to an embodiment, the display may further include a display panel layer, the display panel layer may include a curved area and a substantially flat area, and at least part of the first sensor may be disposed in an area that corresponds to a first area of the display and the curved area. In an embodiment, the opening may be formed in an area of the at least one layer that corresponds to the substantially flat area. In an embodiment, the curved area may be formed on a periphery of the display.

According to an embodiment, the display may further include a cushion layer, and a plurality of openings may be formed in an area of the cushion layer that corresponds to an area in which the first sensor is disposed.

According to an embodiment, the display may further include a cushion layer, and an area of the cushion layer that corresponds to an area in which the first sensor is disposed may be removed.

According to an embodiment, the first sensor may include at least one of a proximity sensor, an illuminance sensor, a gesture sensor, a motion sensor, a fingerprint recognition sensor, or a biometric sensor.

According to an embodiment, the electronic device may further include a display driver IC, and the display driver IC may transmit a first image signal to the first area and a second image signal to the second area. According to an embodiment, the first image signal may include a signal for indicating a status of the electronic device, and the second image signal may include a signal for displaying an execution screen of an application. In an embodiment, the first image signal may include information associated with the execution screen of the application.

According to an embodiment, at least some of the first pixels may be arranged in a first arrangement having an interval longer than a first distance, and the second pixels may be arranged in a second arrangement having an interval equal to a second distance, the second distance being less than the first distance.

An electronic device according to another embodiment of the present disclosure may include a display that includes a first area including pixels arranged in a first structure and a second area including pixels arranged in a second structure, an opening formed in at least part of the display, one or more sensors disposed below the first area, and an image sensor that is disposed in or below the opening and that receives light through the opening.

According to an embodiment, at least part of the first area may include at least one of an electrode and/or an interconnection wire that is substantially transparent. In an embodiment, the at least part of the first area may provide a light transmittance over a specified range.

According to an embodiment, the one or more sensors may include at least one of a proximity sensor, an illuminance sensor, a gesture sensor, a motion sensor, a fingerprint recognition sensor, or a biometric sensor.

According to an embodiment, the display may further include a cushion layer, and the opening may be formed in part of the cushion layer. In an embodiment, the display may further include a display panel layer, and the opening may be formed in the part of the cushion layer and part of the display panel layer. In an embodiment, the display may further include a polarization layer, and the opening may be formed in the part of the cushion layer, the part of the display panel layer, and part of the polarization layer. In an embodiment, the display may further include a flexible cover glass layer and a rigid cover glass layer disposed on the flexible cover glass layer, and the opening may be formed in the part of the cushion layer, the part of the display panel layer, the part of the polarization layer, and part of the flexible cover glass layer.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1040) including an instruction stored in a machine-readable storage media (e.g., an internal memory 1036 or an external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The machine-readable storage media may be provided in the form of non-transitory storage media.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™) In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display including a first area having a plurality of first pixels arranged with a first density and a second area having a plurality of second pixels arranged with a second density, the first area of the display having a lower pixel density than does the second area of the display,
wherein the display includes at least one layer formed in at least part of the first area and in at least part of the second area;
a first sensor configured to detect incident light through at least part of the first area; and
a second sensor configured to generate image data using incident light received through the first area,
at least parts of the first and second sensors being provided in the first area of the display having the lower pixel density,
wherein the first area is not surrounded by the second area,
wherein the at least one layer comprises a cushion layer,
wherein the cushion layer includes a first opening corresponding to the first sensor and a second opening corresponding to the second sensor,
wherein the second opening is larger than the first opening,
wherein the second sensor comprises a light receiving sensor,
wherein the first sensor is at least partially overlapped with at least one sub-pixel included in the plurality of first pixels, and
wherein the second sensor is not overlapped with the at least one sub-pixel.

2. The electronic device of claim 1, wherein the display further includes a display panel layer.

3. The electronic device of claim 2, wherein the display further includes a polarization layer.

4. The electronic device of claim 3, wherein the display further includes a flexible cover glass layer, and
a rigid cover glass layer disposed on the flexible cover glass layer.

5. The electronic device of claim 2,
wherein the display panel layer includes a curved area and a substantially flat area, and
wherein at least part of the first sensor is disposed in an area that corresponds to the first area of the display and the curved area.

6. The electronic device of claim 5, wherein the first opening and the second opening are formed in an area of the at least one layer corresponding to the substantially flat area.

7. The electronic device of claim 5, wherein the curved area is on a periphery of the display.

8. The electronic device of claim 1,
wherein the first opening has a size less than a size of the first sensor as viewed from above.

9. The electronic device of claim 1, further comprising:
a display driver IC,
wherein the display driver IC is configured to transmit a first image signal to the first area and to transmit a second image signal to the second area.

10. The electronic device of claim 9, wherein the first image signal includes a signal for indicating a status of the electronic device, and
wherein the second image signal includes a signal for displaying an execution screen of an application.

11. The electronic device of claim 1, wherein at least some of the first pixels are arranged in a first arrangement having an interval greater than a first distance, and
wherein the second pixels are arranged in a second arrangement having an interval equal to a second distance, the second distance being less than the first distance.

12. An electronic device comprising:
a display including a display panel layer including a first area having pixels arranged in a first structure and a second area having pixels arranged in a second structure, the first area of the display panel layer having a lower pixel density than does the second area of the display panel layer;
a first sensor disposed below the first area; and
a second sensor disposed at least partially in or below the display panel layer and configured to receive light through the first area,
wherein the first area is not surrounded by the second area,
at least parts of the first sensor and the second sensor being provided in the first area of the display panel layer having the lower pixel density,
wherein the display panel layer includes an opening corresponding to the second sensor,
wherein the second sensor comprises a light receiving sensor,
wherein the first sensor is at least partially overlapped with one or more sub-pixels included in the pixels in the first area, and
wherein the second sensor is not overlapped with the one or more sub-pixels.

13. The electronic device of claim 12, wherein at least part of the first area includes at least one of: an electrode and/or an interconnection wire that is substantially transparent.

14. The electronic device of claim 13, wherein the at least part of the first area provides a light transmittance over a specified range.

15. The electronic device of claim 12, wherein the first sensors includes at least one of: a proximity sensor, an illuminance sensor, a gesture sensor, a motion sensor, a fingerprint recognition sensor, and/or a biometric sensor.

16. The electronic device of claim 12, wherein the display further includes a cushion layer, and
wherein the cushion layer includes a first opening corresponding to the first sensor and a second opening corresponding to the second sensor.

17. The electronic device of claim 16, wherein
the opening of the display panel layer and the opening of the cushion layer are formed in one body.

18. The electronic device of claim 17, wherein the display further includes a polarization layer, and
wherein an opening is formed in part of the polarization layer to correspond to the opening of the display panel layer.

19. The electronic device of claim 18, wherein the display further includes a flexible cover glass layer and a rigid cover glass layer disposed on the flexible cover glass layer, and
wherein an opening is formed in part of the flexible cover glass layer to correspond to the opening of the polarization layer.

* * * * *